United States Patent
Amemiya et al.

(10) Patent No.: US 8,898,313 B2
(45) Date of Patent: Nov. 25, 2014

(54) RELAY DEVICES COOPERATING TO DISTRIBUTE A MESSAGE FROM SAME TERMINAL TO SAME SERVER WHILE SESSION CONTINUES

(75) Inventors: Kouichirou Amemiya, Kawasaki (JP); Kenichi Abiru, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 325 days.

(21) Appl. No.: 13/424,468

(22) Filed: Mar. 20, 2012

(65) Prior Publication Data

US 2012/0254389 A1 Oct. 4, 2012

(30) Foreign Application Priority Data

Apr. 4, 2011 (JP) ................... 2011-082898

(51) Int. Cl.
*G06F 15/16* (2006.01)
*H04L 29/08* (2006.01)
*H04L 25/20* (2006.01)

(52) U.S. Cl.
CPC .......... *H04L 67/1027* (2013.01); *H04L 67/145* (2013.01); *H04L 67/141* (2013.01); *H04L 25/20* (2013.01)
USPC .......................................... 709/227

(58) Field of Classification Search
CPC ...... H04L 67/141; H04L 67/145; H04L 25/20
USPC .......................................... 709/227, 228, 223
See application file for complete search history.

(56) References Cited

U.S. PATENT DOCUMENTS

| | | | |
|---|---|---|---|
| 6,167,438 A | 12/2000 | Yates et al. | |
| 7,924,820 B2 * | 4/2011 | Aluf-Medina | ................ 370/352 |
| 2005/0055435 A1 | 3/2005 | Gbadegesin et al. | |
| 2010/0088417 A1 * | 4/2010 | Amemiya et al. | ............. 709/227 |
| 2011/0035436 A1 * | 2/2011 | Takase et al. | ................. 709/203 |
| 2011/0035585 A1 * | 2/2011 | Haddad | ......................... 713/162 |
| 2011/0040892 A1 * | 2/2011 | Amemiya et al. | ............. 709/235 |

FOREIGN PATENT DOCUMENTS

| | | |
|---|---|---|
| JP | 2001-526814 A | 12/2001 |
| JP | 2005-27304 A | 1/2005 |
| JP | 2010-108479 A | 5/2010 |
| WO | WO 98/53410 | 11/1998 |

OTHER PUBLICATIONS

Japanese Office Action mailed Sep. 24, 2014 for corresponding Japanese Patent Application 2011-082898, with Partial English Translations, 3 pages.

* cited by examiner

*Primary Examiner* — Lance L Barry
(74) *Attorney, Agent, or Firm* — Fujitsu Patent Center

(57) ABSTRACT

A relay device, when receiving response information for initial request information, extracts, from the received response information, first session identification information for identifying a session established between an information processing terminal having transmitted the request information and an information processing device having received the request information, transmits the response information to the information processing terminal, transmits the response information to the information processing terminal, transmits session supporting address information to another relay device, extracts second session identification information from request information for the second time or later received from the information processing terminal, and queries the relay device to which the session supporting address information has already been transmitted, for the session supporting address information corresponding to the extracted second session identification information.

20 Claims, 46 Drawing Sheets

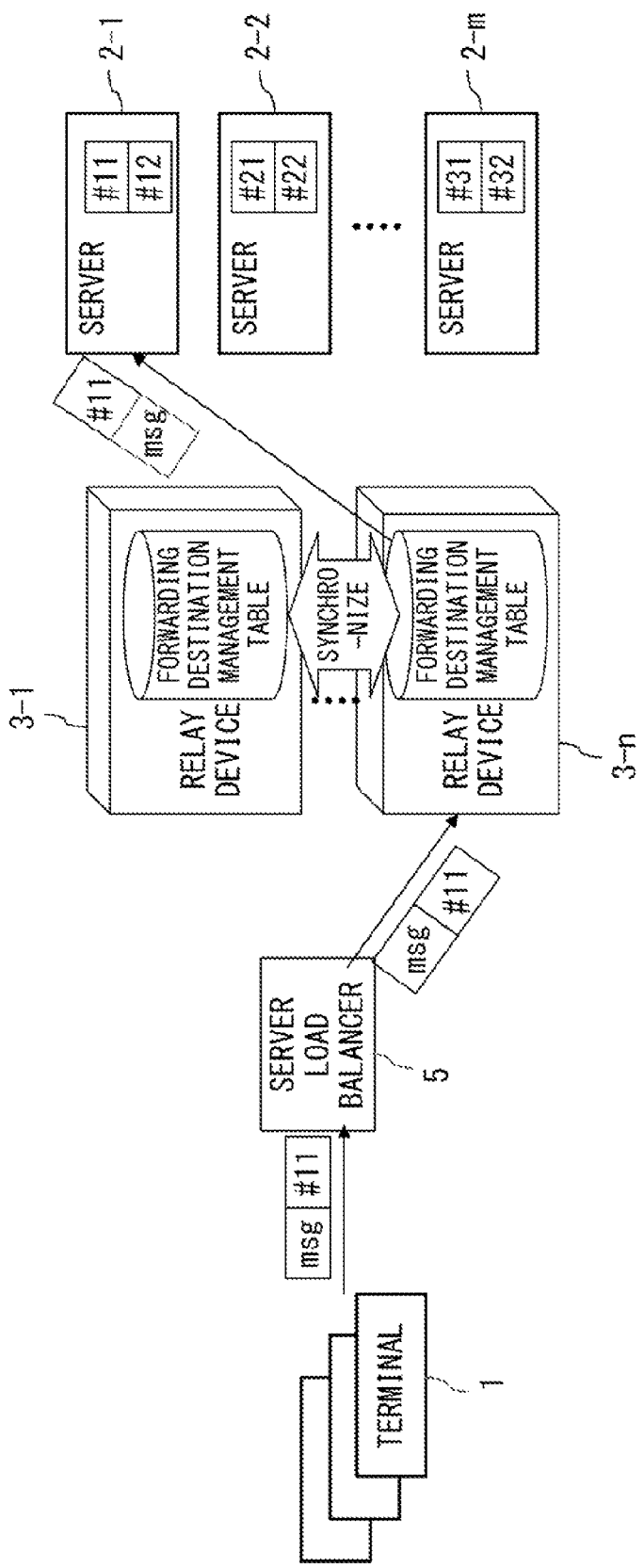
F I G. 1

22

| QUERY DESTINATION ADDRESS |
|---|
| ADDRESS OF QUERY DEVICE TO BE QUERY DESTINATION FOR MESSAGE FORWARDING DESTINATION INFORMATION IS LISTED |

F I G. 6

| DISTRIBUTION DESTINATION ADDRESS |
|---|
| ADDRESS OF RELAY DEVICE TO BE DISTRIBUTION DESTINATION FOR MESSAGE FORWARDING DESTINATION INFORMATION IS LISTED |
F I G. 7

| RELAY DEVICE ADDRESS |
|---|
| ADDRESSES OF RELAY DEVICES EXISTING IN RELAY SYSTEM ARE LISTED |
F I G. 8

| SESSION ID (KEY) | FORWARDING DESTINATION ADDRESS |
|---|---|
| IDENTIFIER USED FOR UNIQUELY IDENTIFYING REQUEST BY TERMINAL AND PICKING UP SESSION DATA | IP ADDRESS (OR HOST NAME) AND PORT NUMBER OF SERVER HOLDING SESSION DATA IDENTIFIED BY SESSION ID IN LEFT COLUMN |

FIG. 12

| | | msg (1) |
|---|---|---|
| L2 HEADER | Source MAC | MAC ADDRESS OF SERVER LOAD BALANCER |
| | Destination MAC | MAC ADDRESS OF RELAY DEVICE |
| PACKET HEADER (L3/L4) | Source IP:Port | IP ADDRESS AND PORT NO. OF ORIGINATING SOURCE (TERMINAL) |
| | Destination IP:Port | IP ADDRESS AND PORT NO. ASSIGNED TO RELAY DEVICE |
| HTTP PROTOCOL HEADER | | |
| MESSAGE CONTENT | | |

FIG. 14

| L2 HEADER | Source MAC | MAC ADDRESS OF RELAY DEVICE TO BE QUERY SOURCE OF FORWARDING DESTINATION INFORMATION |
|---|---|---|
| | Destination MAC | MAC ADDRESS OF RELAY DEVICE TO BE QUERY DESTINATION OF FORWARDING DESTINATION INFORMATION |
| PACKET HEADER (L3/L4) | Source IP:Port | IP ADDRESS AND PORT NO. OF RELAY DEVICE TO BE QUERY SOURCE OF FORWARDING DESTINATION INFORMATION |
| | Destination IP:Port | IP ADDRESS AND PORT NO. OF RELAY DEVICE TO BE QUERY DESTINATION OF FORWARDING DESTINATION INFORMATION FOR ACCEPTING QUERY |
| HTTP PROTOCOL HEADER | SESSION ID | |
| MESSAGE CONTENT | SESSION ID | | msg (2)

FIG. 15

| | | |
|---|---|---|
| L2 HEADER | Source MAC | MAC ADDRESS OF RELAY DEVICE TO BE QUERY DESTINATION OF FORWARDING DESTINATION INFORMATION |
| | Destination MAC | MAC ADDRESS OF RELAY DEVICE TO BE QUERY SOURCE OF FORWARDING DESTINATION INFORMATION |
| PACKET HEADER (L3/L4) | Source IP:Port | IP ADDRESS AND PORT NO. OF RELAY DEVICE TO BE QUERY DESTINATION OF FORWARDING DESTINATION INFORMATION FOR ACCEPTING QUERY |
| | Destination IP:Port | IP ADDRESS AND PORT NO. OF RELAY DEVICE TO BE QUERY SOURCE OF FORWARDING DESTINATION INFORMATION |
| HTTP PROTOCOL HEADER | SESSION ID | SESSION ID |
| MESSAGE CONTENT | SERVER ADDRESS OF FORWARDING DESTINATION | IP ADDRESS OF SERVER HOLDING SESSION DATA IDENTIFIED BY SESSION ID | msg (3)

| | | |
|---|---|---|
| L2 HEADER | Source MAC | MAC ADDRESS OF RELAY DEVICE |
| | Destination MAC | MAC ADDRESS OF SERVER |
| PACKET HEADER (L3/L4) | Source IP:Port | IP ADDRESS AND PORT NO. OF RELAY DEVICE |
| | Destination IP:Port | IP ADDRESS AND PORT NO. OF SERVER |
| HTTP PROTOCOL HEADER | | |
| MESSAGE CONTENT | | | msg (4)

F I G. 1 6

| | | |
|---|---|---|
| L2 HEADER | Source MAC | MAC ADDRESS OF RELAY DEVICE |
| | Destination MAC | MAC ADDRESS OF SERVER |
| PACKET HEADER (L3/L4) | Source IP:Port | IP ADDRESS AND PORT NO. OF RELAY DEVICE |
| | Destination IP:Port | IP ADDRESS AND PORT NO. OF SERVER |
| HTTP PROTOCOL HEADER | COOKIE FIELD | SESSION ID |
| MESSAGE CONTENT | | | msg (4)

| L2 HEADER | Source MAC | MAC ADDRESS OF SERVER |
| --- | --- | --- |
| | Destination MAC | MAC ADDRESS OF RELAY DEVICE |
| PACKET HEADER (L3/L4) | Source IP:Port | IP ADDRESS AND PORT NO. OF SERVER |
| | Destination IP:Port | IP ADDRESS AND PORT NO. OF RELAY DEVICE |
| HTTP PROTOCOL HEADER | SET-COOKIE FIELD | SESSION ID |
| MESSAGE CONTENT | | | msg (5)

| | | |
|---|---|---|
| L2 HEADER | Source MAC | MAC ADDRESS OF RELAY DEVICE |
| | Destination MAC | MAC ADDRESS OF SERVER LOAD BALANCER |
| PACKET HEADER (L3/L4) | Source IP:Port | IP ADDRESS AND PORT NO. OF RELAY DEVICE |
| | Destination IP:Port | IP ADDRESS AND PORT NO. OF TERMINAL |
| HTTP PROTOCOL HEADER | SET-COOKIE FIELD | SESSION ID |
| MESSAGE CONTENT | | | msg (6)

FIG. 21

| | | |
|---|---|---|
| L2 HEADER | Source MAC | MAC ADDRESS OF RELAY DEVICE TO BE DISTRIBUTION SOURCE OF FORWARDING DESTINATION INFORMATION |
| | Destination MAC | MAC ADDRESS OF RELAY DEVICE TO BE DISTRIBUTION DESTINATION OF FORWARDING DESTINATION INFORMATION |
| PACKET HEADER (L3/L4) | Source IP:Port | IP ADDRESS AND PORT NO. OF RELAY DEVICE TO BE DISTRIBUTION SOURCE OF FORWARDING DESTINATION INFORMATION |
| | Destination IP:Port | IP ADDRESS AND PORT NO. OF RELAY DEVICE TO BE DISTRIBUTION DESTINATION OF FORWARDING DESTINATION INFORMATION FOR ACCEPTING DISTRIBUTION |
| HTTP PROTOCOL HEADER | SESSION ID | SESSION ID |
| MESSAGE CONTENT | SERVER ADDRESS OF FORWARDING DESTINATION | IP ADDRESS OF SERVER HOLDING SESSION DATA IDENTIFIED BY THE SESSION ID | msg (7)

F I G. 22

| HIGHEST PRIORITY DISTRIBUTION DESTINATION LIST |
|---|
| #1 |
| #2 |
| #3 |
| #4 |

FIG. 24A

| QUERY DESTINATION LIST |
|---|
| #1 |
| #2 |
| #3 |
| #4 |

FIG. 24B

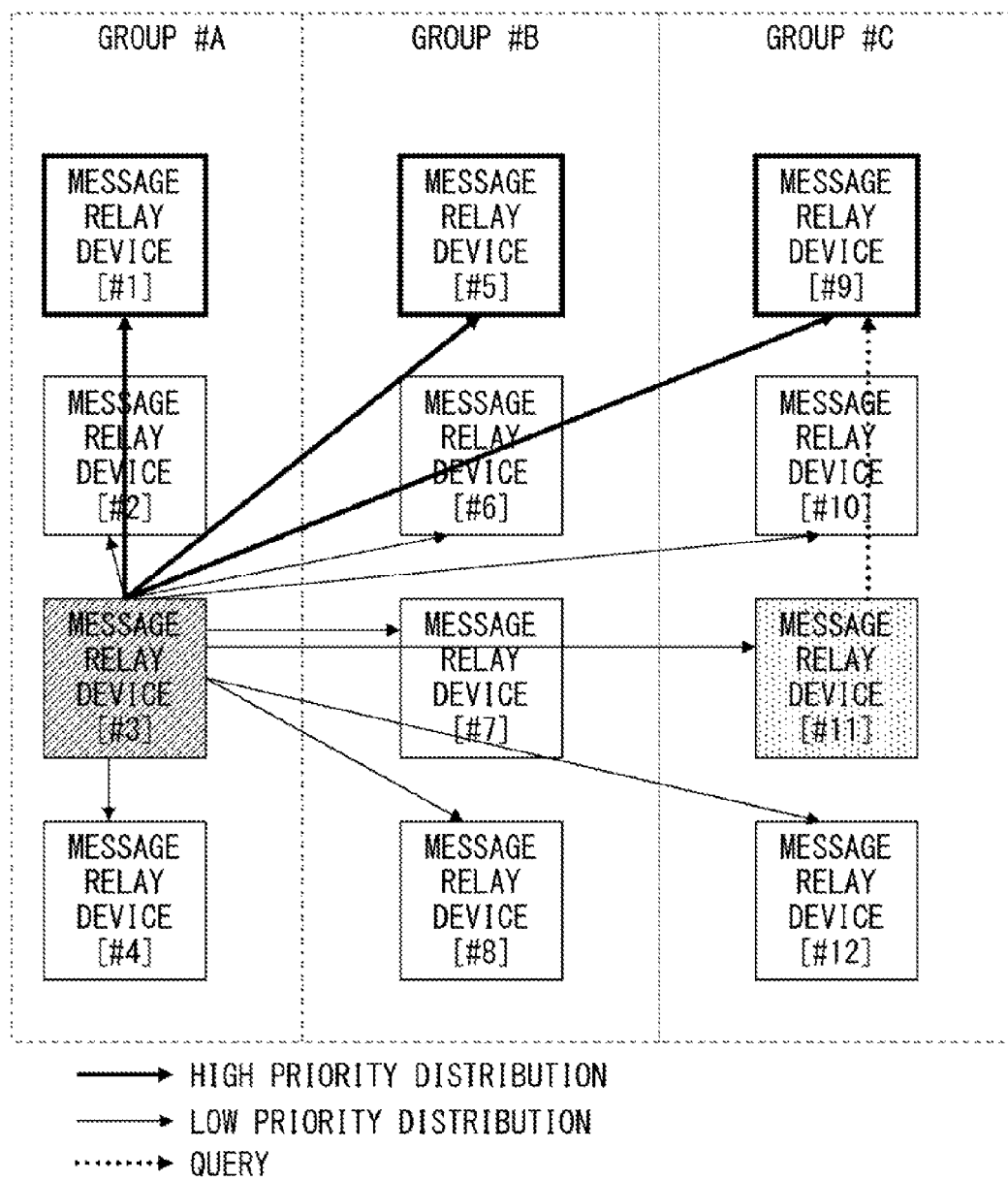
F I G. 2 5

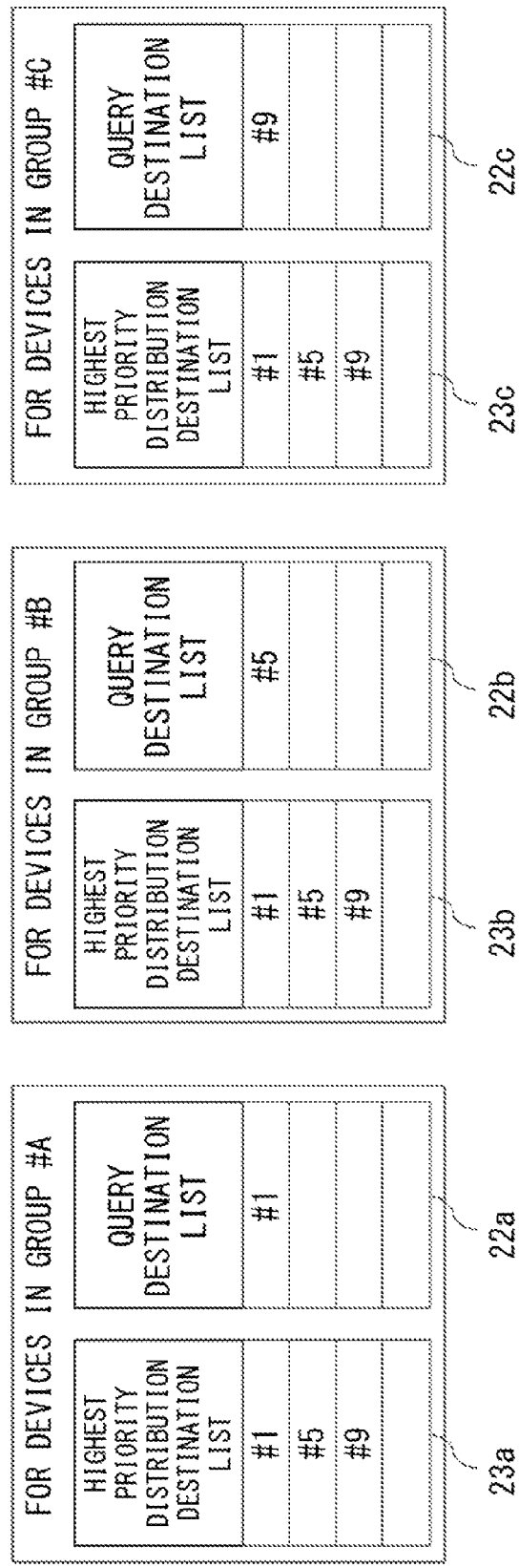

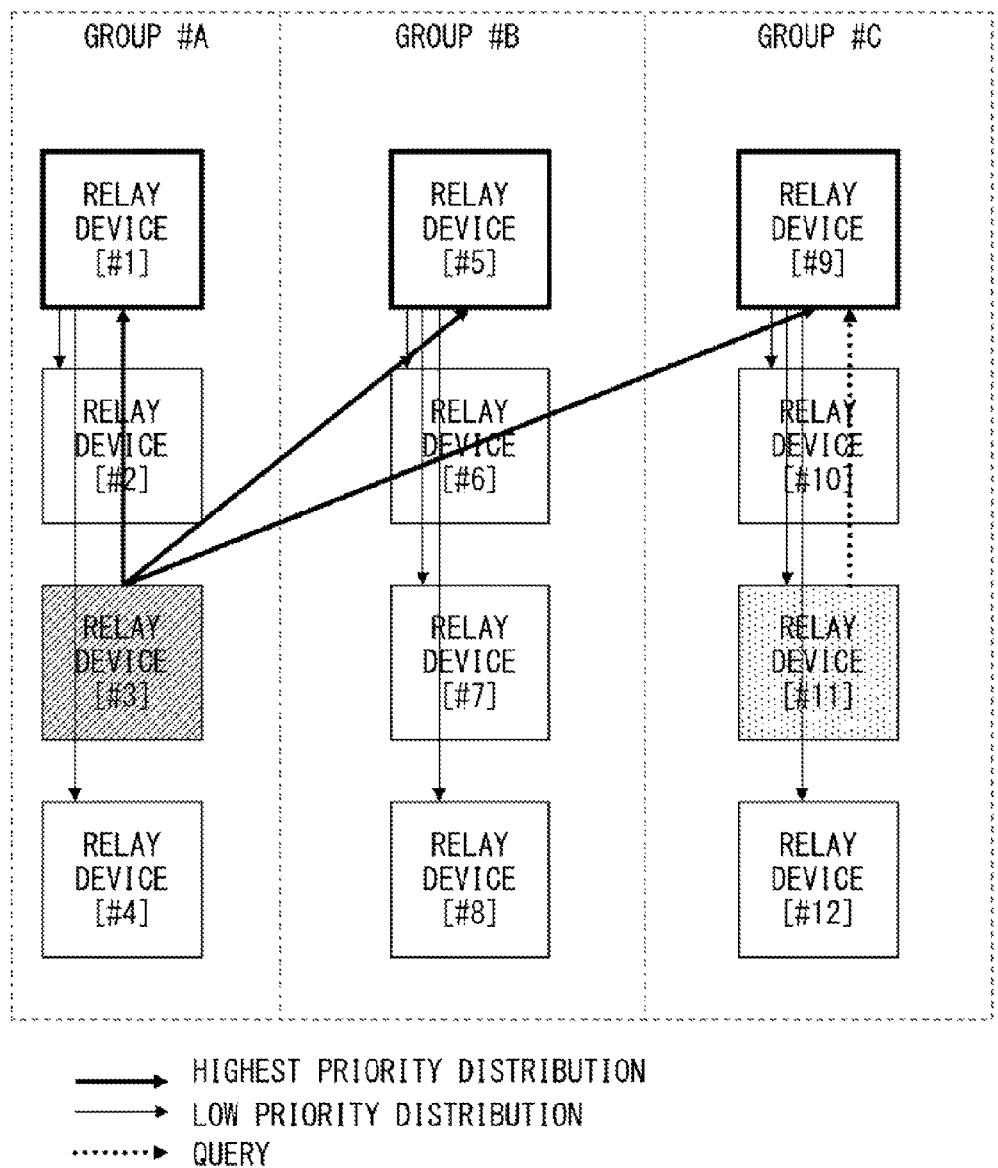
F I G. 2 7

24

| DEVICE ADDRESSES IN GROUP |
|---|
| LIST IN WHICH RELAY DEVICES BELONGING TO GROUP ARE LISTED |

F I G. 29

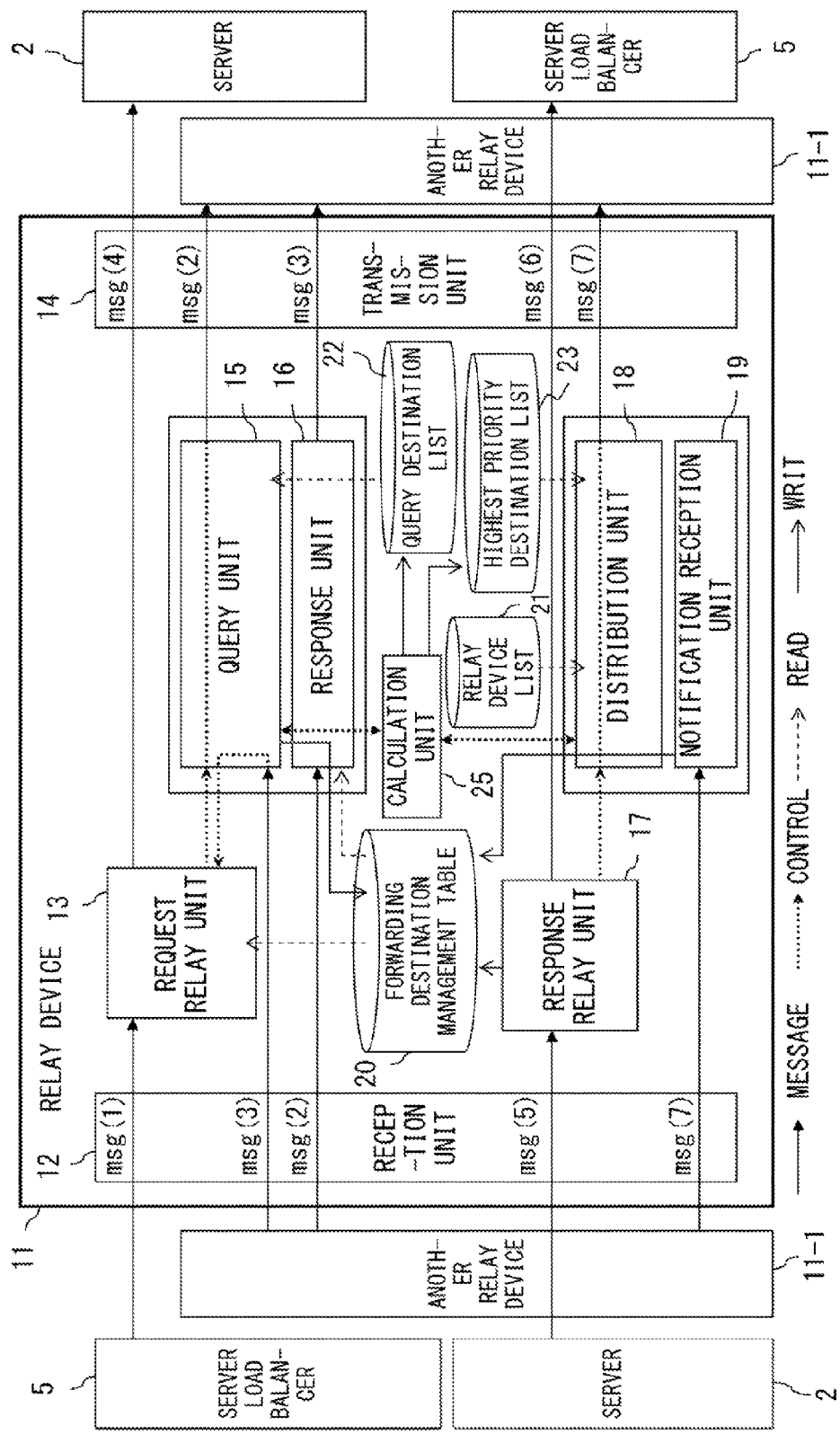
F I G. 32

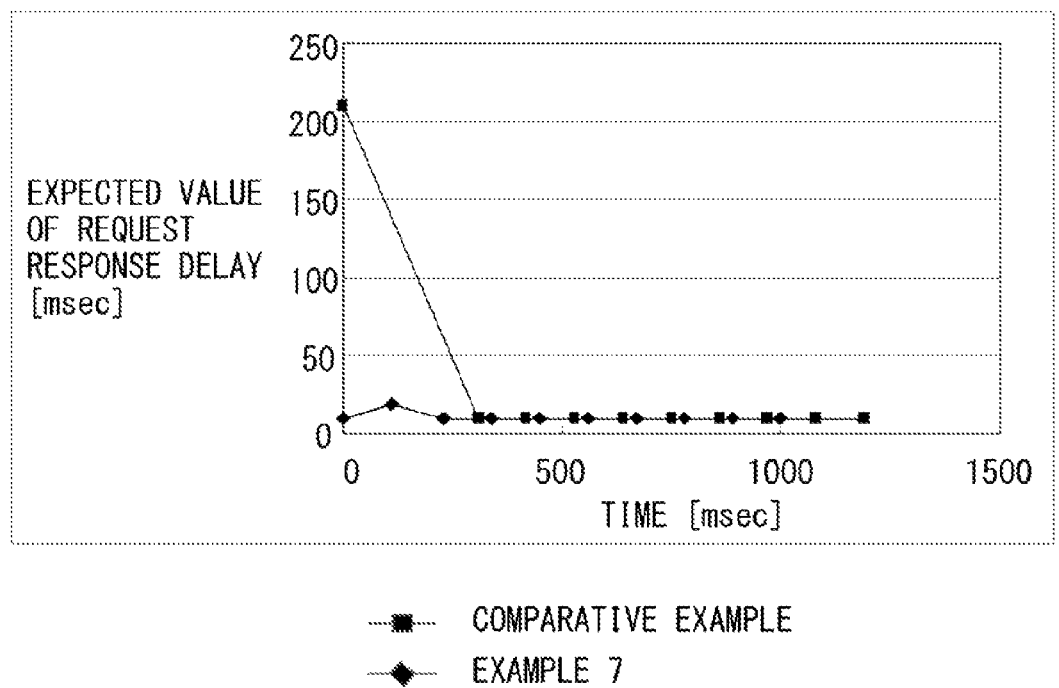
F I G. 4 3

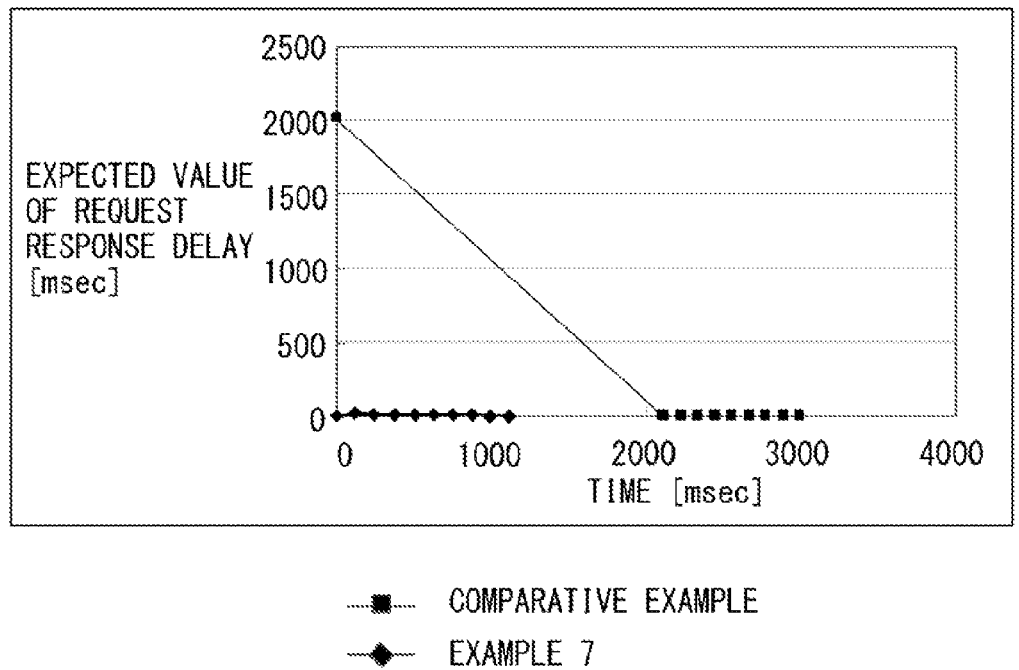
F I G. 4 4

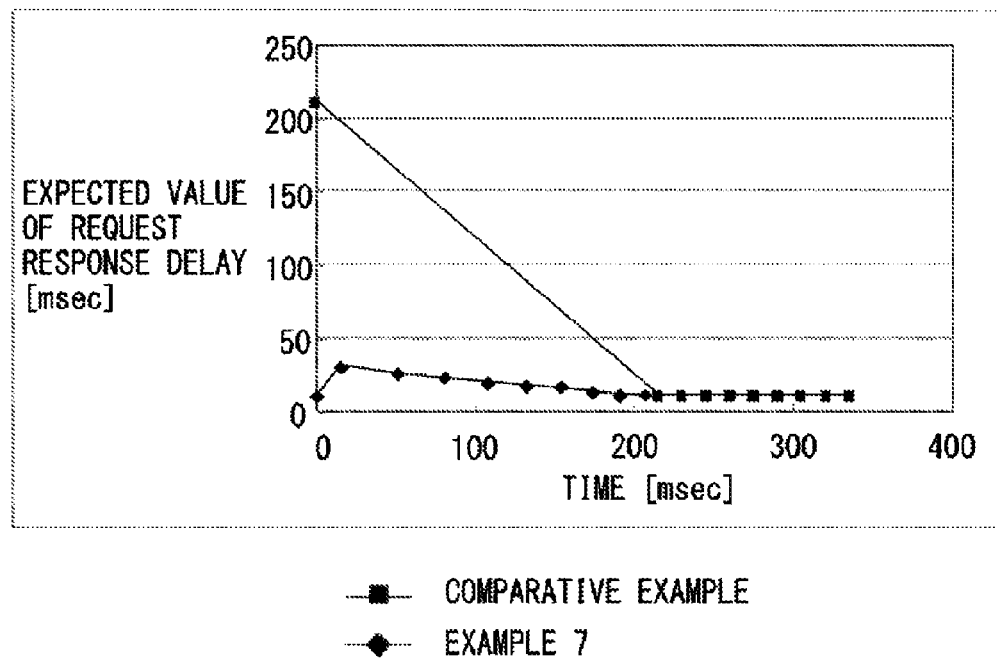
F I G. 4 5

RELAY DEVICES COOPERATING TO DISTRIBUTE A MESSAGE FROM SAME TERMINAL TO SAME SERVER WHILE SESSION CONTINUES

CROSS-REFERENCE TO RELATED APPLICATION

This application is based upon and claims the benefit of priority of the prior Japanese Patent Application No. 2011-082898, filed on Apr. 4, 2011, the entire contents of which are incorporated herein by reference.

FIELD

This specification relates to a technique of communication between an information processing device and an information processing terminal.

BACKGROUND

Presently, communication networks, which are typified by the Internet, have become widespread in society. Accordingly, various services targeting users of information processing terminals (hereinafter, referred to as "terminals") connected to communication networks have been provided using information processing device (hereinafter referred to as, "servers").

The server providing services generates a session in response to a request message received from the terminal, and provides the service targeting a user of the terminal. The session corresponds to a unit according to which the server provides a service for one terminal. The server having generated the session inserts a session ID, which is an identifier for identifying the generated session, into a message (response) for responding the terminal, and transmits the message. Subsequently, the terminal having received the message, into which the session ID has been inserted, transmits this message with the session ID inserted thereinto to the server. This allows the server to continue to provide the service by means of the session ID in the message received from the terminal.

In a case of performing a process of relaying a communication between the terminal and the server using the content of the message, a processing load on the relay device becomes high. There is a scale-out scheme, which is an example of a method used for the sake of improving the throughput of the relay process. The scale-out scheme improves the processing capacity of the relay system by arranging CPUs and causing the CPUs to perform parallel processing.

FIG. 1 is a diagram for illustrating a relay system adopting the scale-out scheme. The relay system includes a plurality of relay devices 3 (3-1, . . . , 3-n). In FIG. 1, an L4-server load balancer (L4-SLB) 5 is arranged upstream from the parallel arranged relay devices 3 (3-1, . . . , 3-n). The L4-server load balancer 5 performs a process that refers to the L3 header or the L4 header of each of packets and distributes the packets among the relay devices 3. The relay device 3 performs a process that constructs a message out of the packet, refers to the session ID to determine the forwarding destination of the message and transmits the message.

When the packet is distributed, the L4-server load balancer 5 does not refer to the session ID. Accordingly, request messages including the identical session ID do not necessarily reach the relay device 3 having previously been used.

The relay device 3, having relayed the first request message and response message, holds information (forwarding destination information) including the session ID and the server address as the message forwarding destination that corresponds to the session ID.

On the other hand, the other relay devices 3 fail into a state without the forwarding destination information. In this state, the relay devices 3 are incapable of delivering a request message issued by the terminal 1 to the server 2 having session data. Accordingly, the parallel arranged relay system includes a mechanism of synchronizing forwarding destination management tables 4. When a session is established, the forwarding destination information is synchronized among the relay devices 3. This allows the subsequent message to be successfully forwarded to the corresponding server even if this message is assigned to any relay device. It can be considered that there are two methods of synchronizing a forwarding destination management table, for example, as depicted in FIG. 2 and FIG. 3.

FIG. 2 depicts the first synchronization scheme of forwarding destination management table. The first synchronization scheme of the forwarding destination management table is a scheme that synchronizes items of (forwarding destination information) of the forwarding destination management tables 4 (4-1, 4-2, . . . , 4-n) among the relay devices 3 (3-1, 3-2, . . . , 3-n). According to this method, the forwarding destination information is distributed from the relay device 3 having relayed the initial request and response messages including a specific session ID, to the other relay devices 3.

FIG. 3 depicts the second synchronization scheme of the forwarding destination management table. The second synchronization scheme of the forwarding destination management table is a scheme that provides a forwarding destination setting mechanism 7 outside the group of relay devices 3. The forwarding destination setting mechanism 7 distributes the forwarding destination information to each relay device 3. The forwarding destination setting mechanism 7 collects information on the server address for holding the session ID and the session data from the server 2 when the session is established. The forwarding destination setting mechanism 7 generates the forwarding destination information on the basis of the collected information, and directs this information to each relay device 3.

Since the forwarding destination information in the relay devices can thus be synchronized thereamong, the relay device 3 is capable of directing a request from the identical terminal 1 to the identical server 2-1 during the session is maintained (uniqueness assurance).

Patent Document 1: Japanese Patent Laid-Open No. 2001-526814

Patent Document 2: Japanese Patent Laid-Open No. 2010-108479

SUMMARY

A relay device relaying communication between an information processing terminal and an information processing device includes the first extraction unit, a transmission unit, the second extraction unit, and a query unit. When response information for initial request information issued by the information processing terminal is received from the information processing device, the first extraction unit performs following processes. That is, the first extraction unit extracts first session identification information for identifying a session established between the information processing terminal and the information processing device, and an address of the information processing device, from the received response information, and stores the extracted information and address in the first storage unit. The transmission unit transmits the response information to the information processing terminal, and transmits session corresponding address information including the extracted first session identification information and address of the information processing device to at least one of other relay devices. The second extraction unit extracts second session identification information, from request information for a second time or later received from the information processing terminal. If the session corresponding address information corresponding to the extracted second session identification information is not stored in the first storage unit, the query unit queries the at least one of the other relay devices for the session corresponding address information corresponding to the second session identification information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a diagram for illustrating a relay system adopting the scale-out scheme.

FIG. 6 depicts an example of a query destination list 22.

FIG. 7 depicts an example of a highest priority distribution destination list 23.

FIG. 8 depicts an example of a relay device list 21.

FIG. 12 depicts a data structure of a request message (msg (1)) (before establishment of a session) forwarded from a server load balancer to the relay device.

FIG. 14 depicts an example of a data structure of a query message (msg (2)) transmitted from the relay device as the query source to the relay device as the query destination.

FIG. 15 depicts an example of a data structure of a query response message (msg (3)) transmitted from the relay device as the query destination to the relay device as the query source.

FIG. 16 depicts an example of a data structure of a request message (msg (4)) (before establishment of the session) forwarded from the relay device to the server.

FIG. 17 depicts an example of the request message (msg (4)) (after establishment of the session) forwarded from the relay device to the server.

FIG. 20 depicts an example of a data structure of a response message (msg (5)) forwarded from the server to the relay device.

FIG. 21 depicts an example of a data structure of a response message (msg (6)) forwarded from the relay device to the server load balancer.

FIG. 22 depicts an example of a data structure of a notification message (msg (7)) distributed from the relay device as the distribution source to the relay device of the distribution destination.

FIG. 24A depicts an example of highest priority distribution destination list in Example 1. FIG. 24B depicts an example of query destination list in Example 1.

FIG. 25 depicts an example of a configuration of a message relay system in Example 2.

FIGS. 26A, 26B and 26C depict examples of the highest priority distribution destination lists and the query destination lists set in the relay devices in each group in Example 2.

FIG. 27 depicts an example of a configuration of a message relay system in Example 3.

FIG. 29 depicts an example of a list of the devices in a group in Example 3.

FIG. 32 depicts an example of a relay device in Example 4.

FIG. 43 depicts a graph (1) illustrating a response time (expected value) to each request and time taken to completion of one service session (provided that the session includes ten messages).

FIG. 44 depicts a graph (2) illustrating a response time (expected value) to each request and time taken to completion of one service session (provided that the session includes ten messages).

FIG. 45 depicts a graph (3) illustrating a response time (expected value) to each request and time taken to completion of one service session (provided that the session includes ten messages).

DESCRIPTION OF EMBODIMENTS

Figure 2:
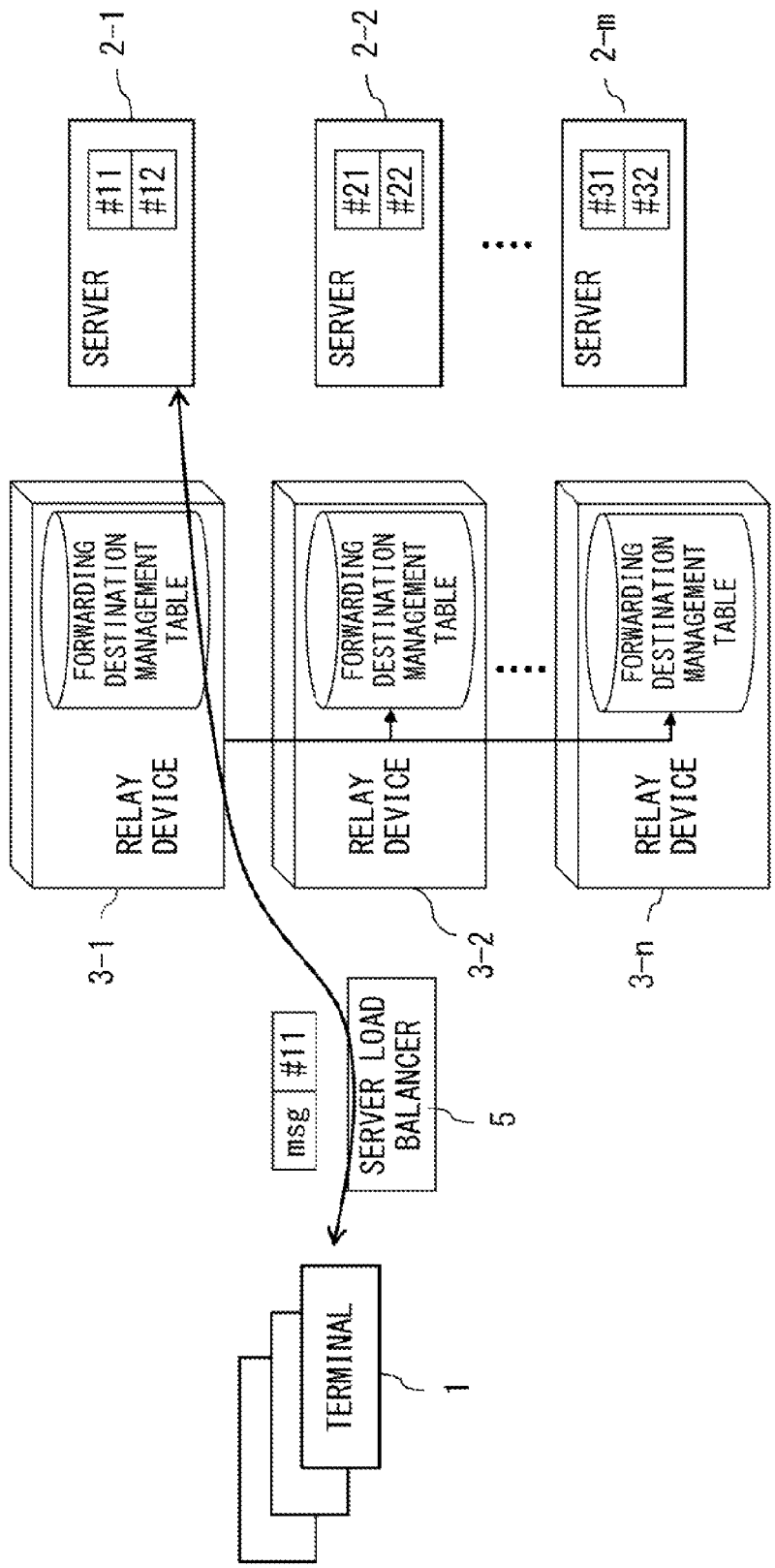
FIG. 2 depicts the first synchronization scheme of a forwarding destination management table.
Figure 3:
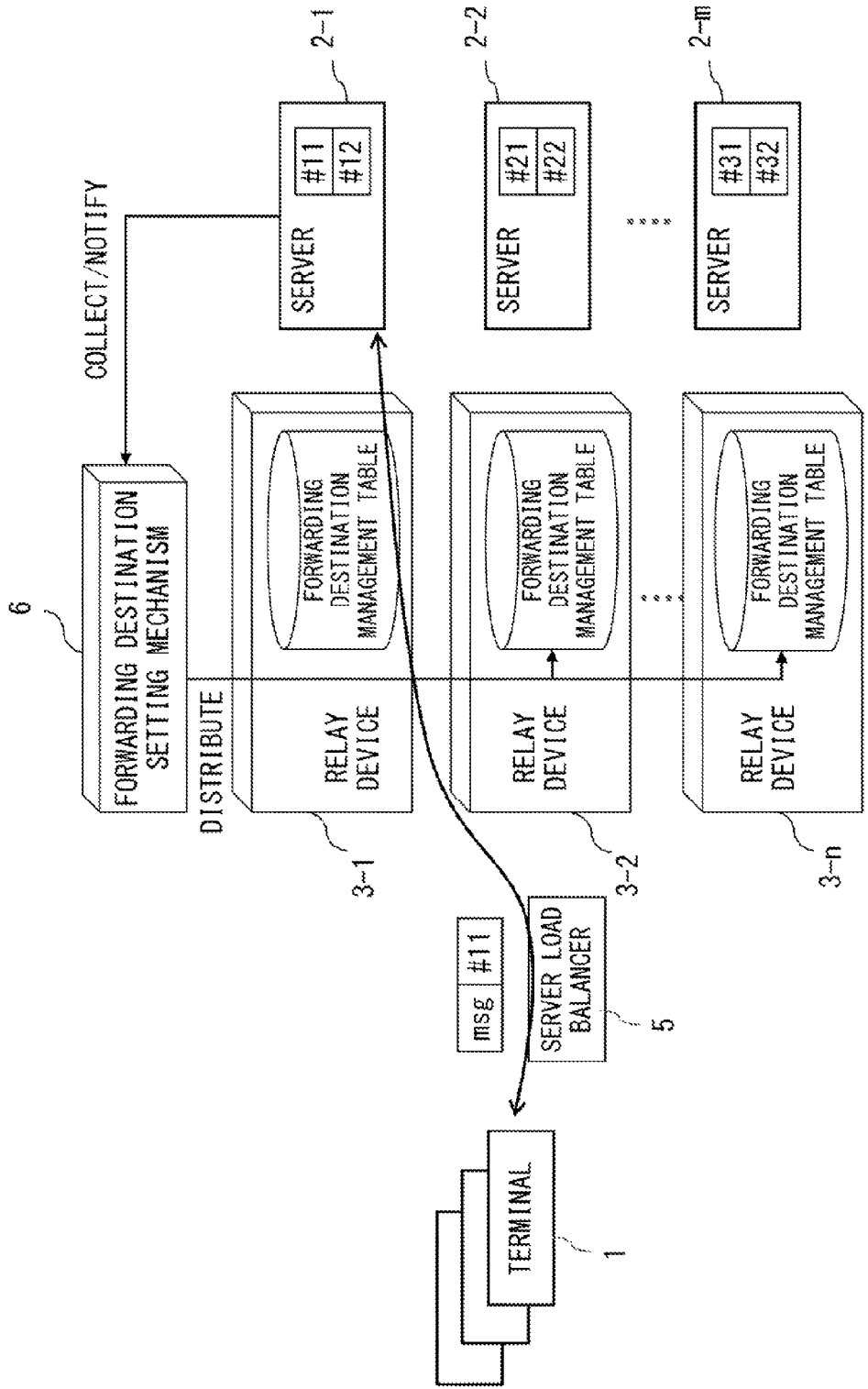
FIG. 3 depicts the second synchronization scheme of the forwarding destination management table.

In order to securely deliver a message including a certain session ID to a server holding session data identified by the session ID and thus assure uniqueness of a service, the following are required. That is, it is required to perform processing on a subsequent request message after confirmation of completion of setting forwarding destination information to all the other relay devices.

However, the number of relay devices distributing the forwarding destination information increases with an increase in the degree of parallelism of the relay devices. As described above, in order to assure uniqueness, no response is returned to the terminal until completion of distributing the forwarding destination information to all the relay devices. Accordingly, delay in response to the terminal increases with increase in degree of parallelism of the relay devices.

Thus, this specification provides a relay technique that reduces delay time from the time when the information processing terminal transmits request information to the time when the information processing device returns response information to the request information.

This embodiment realizes the following. That is, (A) when the server transmits a response message to the terminal, forwarding destination information is not distributed to the parallel arranged relay devices on establishment of a session, and a response from the server is returned to the terminal. Here, only the relay device through which the message has passed holds the message forwarding destination information when the response is returned.

Next, (B) the relay device, having relayed the message, distributes the forwarding destination information to the other relay devices. This allows all the relay devices to share forwarding destination information in the end.

Further, (C) if the relay device receiving a subsequent message including ID of the established session holds forwarding destination information identified by the session ID included in the subsequent message, this relay device forwards a continuation message thereof to the forwarding destination according to the forwarding destination information. If the relay device do not hold the forwarding destination information identified by the session ID, the relay device queries the other relay device, acquires forwarding destination information from the response, and forwards the continuation message to the forwarding destination.

If selection of the distribution destination of the forwarding destination information in (B) and selection of the query destination for the forwarding destination information in (C) are completely independent of each other, a possibility may arise that a situation in which the destination cannot be identified without querying all the relay devices. In this case, the delay reduction effect due to the mechanism of (A) is canceled. Thus, (D) a list of the distribution destinations and the query destinations of the forwarding destination information is preset in all the parallel arranged relay devices. The list of the distribution destinations and the query destinations of the forwarding destination information is used as a list of the relay devices to which forwarding destination information is preferentially distributed when the distribution is performed, and as a list of the relay devices for the query destination for the forwarding destination information when the query is performed. The number of devices in the list may be one. Instead, a plurality of devices may be listed for the sake of distributing the load or assuring redundancy.

Figure 4:
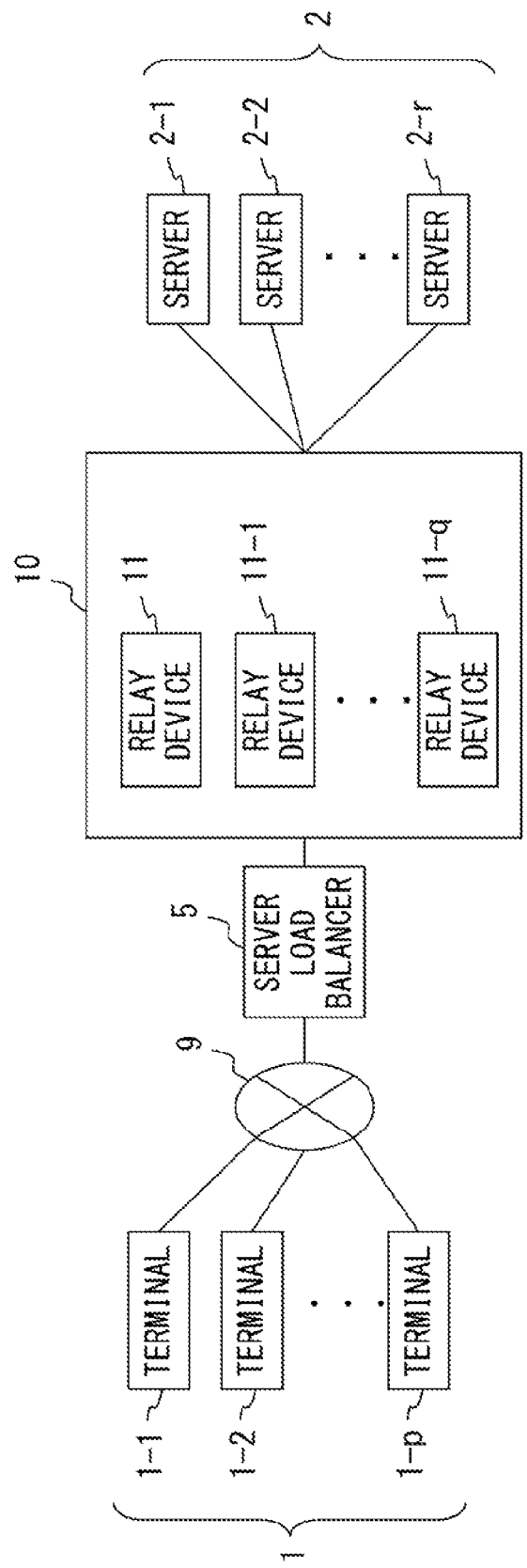
FIG. 4 depicts an example of a communication system performing communication between the terminals and the servers in this embodiment.

FIG. 4 depicts an example of a communication system performing communication between the terminals and the servers in this embodiment. The communication system includes terminals 1 (1-1, 1-2, . . . , 2-$p$), a network 9, a server load balancer 5, a relay system 10, and servers 2 (2-1, 2-2, . . . , 2-$r$). The relay system 10 includes a plurality of relay devices. Hereinafter, a certain relay device among the relay devices is denoted by reference numeral 11, and the other relay devices are denoted by reference numerals 11 (11-1, 11-2, . . . , 11-$q$). Here, p, q and r are arbitrary integers.

The server load balancer 5 is arranged upstream from the relay system 10. The server load balancer 5 receives a packet transmitted from the terminal 1-1 via the network 9. The server load balancer 5 then refers to the L3 header or the L4 header of the packet, and assigns the packet to any of the relay devices, which is for instance the relay device 11.

The relay device 11 constructs a message out of the packet, refers to the session ID to identify the destination of the message, which is for instance the server 2-1, and transmits the message to the server 2-1.

The server 2-1 returns a response message for the request message, to the relay device 11 having transmitted the request message.

When the relay device 11 receives an initial response message for the request message from the server 2, the relay device 11 extracts the session ID from the response message. Here, the session ID is information for identifying the session established between the terminal 1-1 having transmitted the request message and the server 2-1 having received the request message.

The relay device 11 transmits the response message to the terminal 1-1 via the server load balancer 5.

After transmitting the response message to the terminal 1-1, the relay device 11 distributes information (forwarding destination information) including the session ID and the server address of the message forwarding destination corresponding to the session ID to the other relay devices 11-2 to 11-$q$.

For instance, if relay device 11-1 receives a request message for the second time or later before the forwarding destination information is distributed, the relay device 11-1 performs an after-mentioned query process and acquires the forwarding destination information from another relay device to which the forwarding destination information has been distributed. This allows the relay device 11-1 to transmit the subsequent request message to the server 2-1 indicated by the forwarding destination information.

Figure 5:
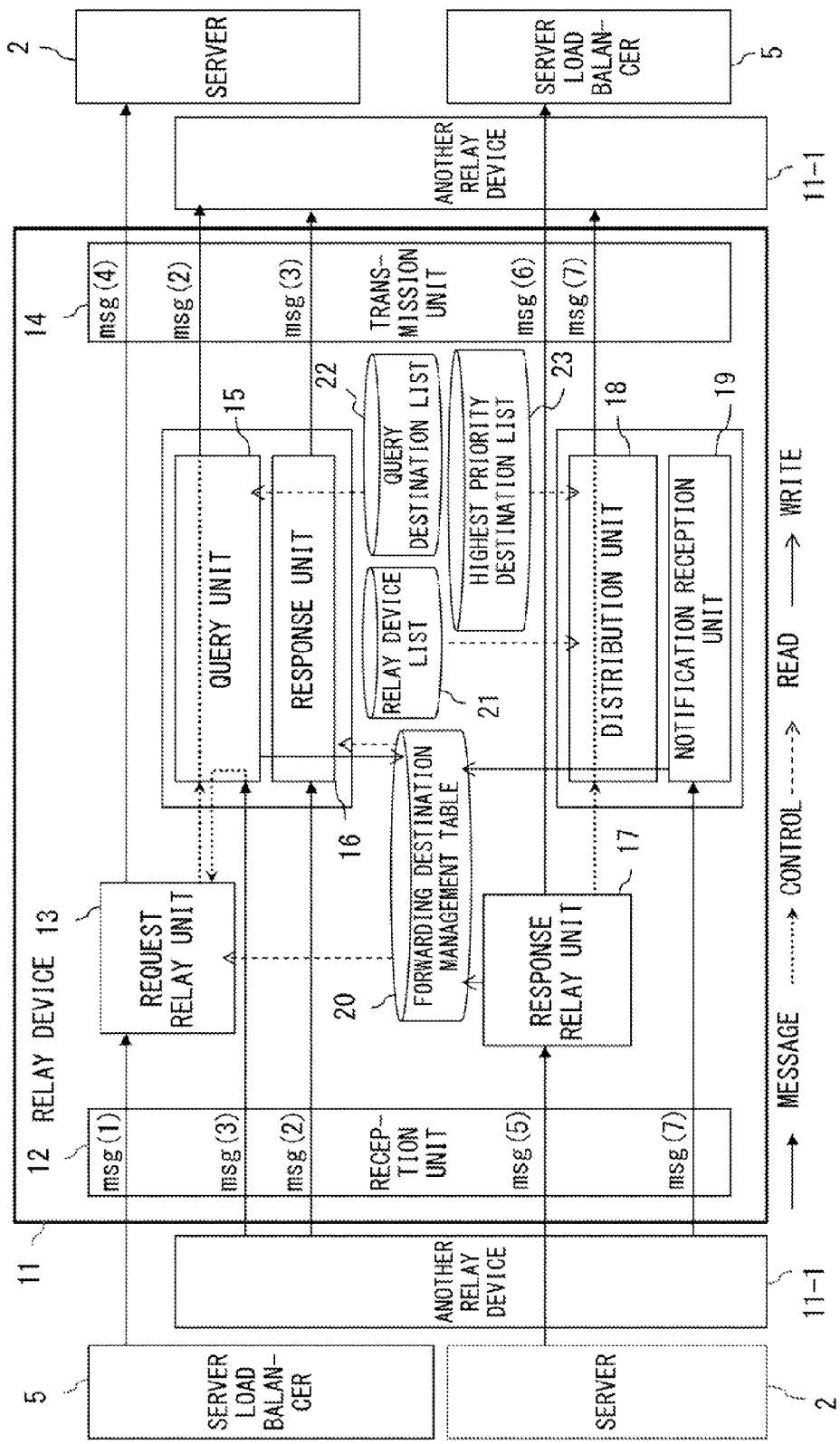
FIG. 5 depicts an example of the relay device in this embodiment.

FIG. 5 depicts an example of the relay device in this embodiment. The relay device 11 includes a reception unit 12, a request relay unit 13, a transmission unit 14, a query unit 15, a response unit 16, a response relay unit 17, a distribution unit 18, and a notification reception unit 19. A storage of the relay device 11 stores a forwarding destination management table 20, a relay device list 21, a query destination list 22, and a highest priority distribution destination list 23. Likewise, the other relay devices 11-1, . . . , 11-$q$ include the reception unit 12, the request relay unit 13, the transmission unit 14, the query unit 15, the response unit 16, the response relay unit 17, the distribution unit 18, and the notification reception unit 19. Hereinafter, for the sake of convenience of description, the relay device 11 is described.

The reception unit 12 receives a message from the outside of the relay device 11. The request relay unit 13 processes the request message issued by the terminal 1. The transmission unit 14 transmits the message to the outside of the relay device 11. The response relay unit 17 processes the response message issued by the server 2.

If the forwarding destination information is not in the forwarding destination management table 20, the query unit 15 generates a query message for querying another relay device 11-1 for forwarding destination information in response to a request by the request relay unit 13. The query unit 15 transmits the generated query message to the other relay device 11-1. The query unit 15 receives a query response message from another relay device 11-1 and notifies the request relay unit 13 of the result of the query. The response unit 16 returns the forwarding destination information, in response to a query from the outside of the relay device 11.

The distribution unit 18 distributes the forwarding destination information to the other relay devices. The notification reception unit 19 receives a notification message including forwarding destination information from another relay device, and records the forwarding destination information in the forwarding destination management table.

The forwarding destination management table 20 is a table for determining the server to be the message destination on the basis of the session ID. The highest priority distribution destination list 23 is a list storing the addresses of the relay devices to which the forwarding destination information is to be distributed after a session is established and the response message is returned to the terminal. The relay device list 21 is a list storing the addresses of relay devices that exist in the relay system. The query destination list 22 is a list storing the addresses of the relay devices that are to be the query destinations for the message forwarding destination information.

FIG. 6 depicts an example of the query destination list 22. In the query destination list 22, the addresses of the query devices to be the query destination for the forwarding destination information are listed.

FIG. 7 depicts an example of the highest priority distribution destination list 23. In highest priority distribution destination list 23, the addresses of the relay devices to be the distribution destinations of the forwarding destination information are listed.

FIG. 8 depicts an example of the relay device list 21. In the relay device list 21, the addresses of the relay devices 11 existing in the relay system are listed.

Figure 9:
FIG. 9 depicts an example of a forwarding destination management table 20.

FIG. 9 depicts an example of the forwarding destination management table 20. The forwarding destination management table 20 is for managing the server address (forwarding destination information) corresponding to the session ID. The forwarding destination management table 20 includes data items of "session ID" 20a and "destination address" 20b. In the session ID is stored in the "session ID" 20a. The session ID is an identifier used by the server 2 for uniquely identifying a request issued by the terminal 1 and picking up session data, and transmitted and received in a manner attached to a message. The IP address (or the host name) and the port number of the server 2 holding the session data identified by the "session ID" 20a is stored in the "destination address" 20b. The relay device 11 forwards the message including the session ID in the "session ID" 20a to the destination server address. Accordingly, the relay device 11 assures continuation of the service between the terminal 1 and the server 2.

Figure 10:
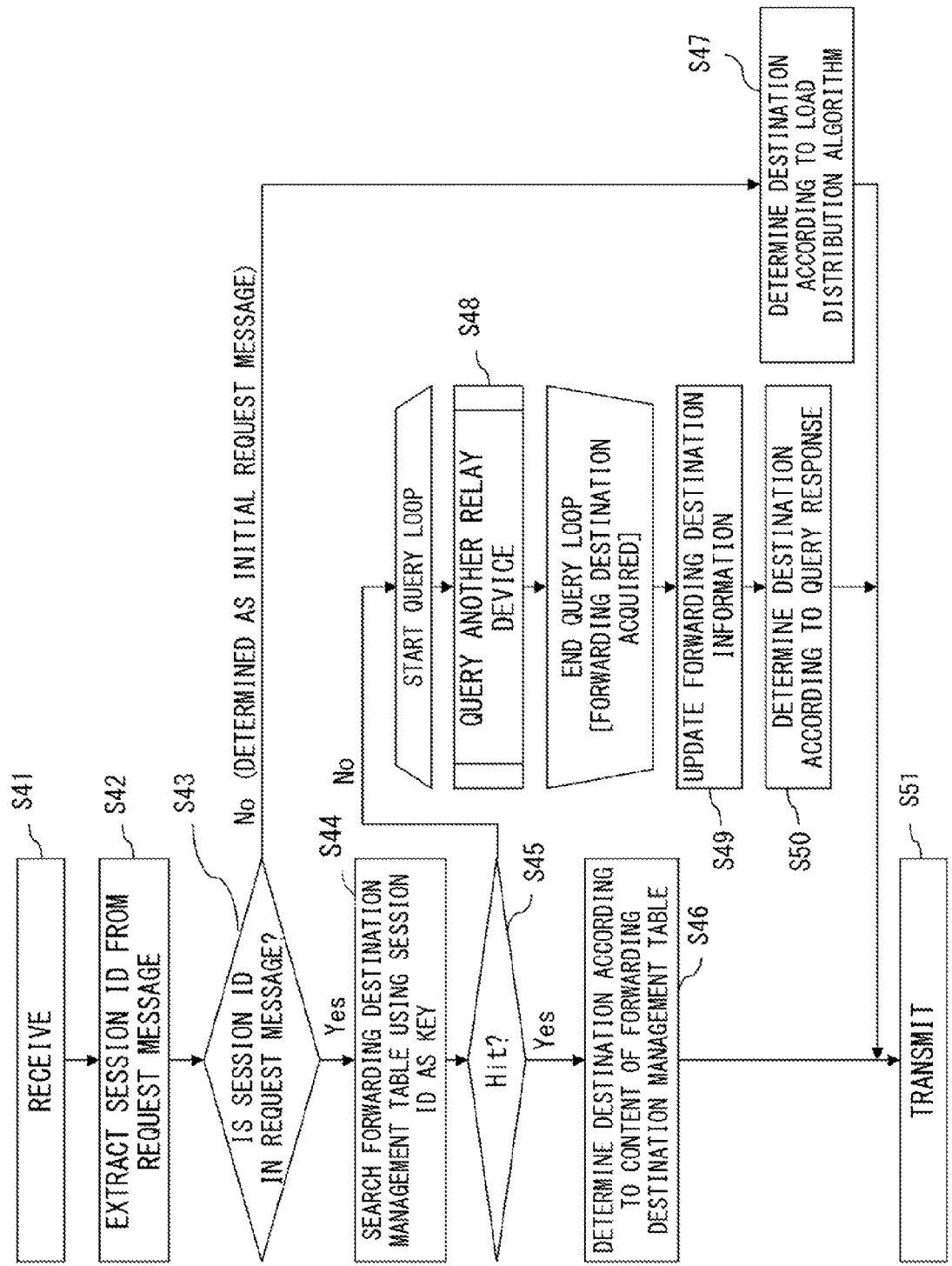
FIG. 10 depicts a flow of a process of relaying a request message in this embodiment.
Figure 13:
FIG. 13 depicts an example of the request message (msg (1)) (after establishment of the session) forwarded from the server load balancer to the relay device.

FIG. 10 depicts a flow of a process of relaying a request message in this embodiment. The reception unit 12 receives a request message (msg (1)) issued by the terminal 1 (S41). The msg (1) will be described with reference to FIGS. 12 and 13. The request relay unit 13 tries to extract the session ID from the layer 7 protocol header or message content of the request message issued by the terminal 1 (S42). In the case where the request received in S41 is the initial request for a service user, the request message of the user has never reached the server and the session ID has not transmitted to the terminal 1. Accordingly, as depicted in FIG. 12, the request message does not include the session ID. On the other hand, the request received in S41 is a request from a user having once accessed the server 2 (subsequent request), the session ID is included in the request message as depicted in FIG. 13. Thus, the request relay unit 13 determines whether the received message is the initial request or the subsequent request according to presence or absence of the session ID, and selects next processes (S43).

If it is determined to be the initial request in S43 ("No" in S43), the request relay unit 13 performs a destination identification process according to a load distribution algorithm (S47). In S47, the request relay unit 13 selects the message destination from among a group of servers according to the load distribution algorithm using a round-robin, a server load monitoring result or the like, and identifies the server as the forwarding destination of the message.

If it is determined as the subsequent request in S43 ("Yes" in S43), the request relay unit 13 performs a destination identification process according to the forwarding destination management table 20. Here, the request relay unit 13 searches the forwarding destination management table 20 using the session ID extracted in S42 as a key (S44).

As a result of the search in S44, if a hit entry has been found in the forwarding destination management table 20 ("Yes" in S45), the request relay unit 13 identifies the destination address set in the entry as the message destination (S46).

As a result of the search in S44, if a hit entry has not been found in the forwarding destination management table 20 (a case of a miss hit) ("No" in S45), the request relay unit 13 performs a following process. That is, the request relay unit 13 requests the query unit 15 to query another relay device 11-1 for the forwarding destination information.

The query unit 15 issues a query message (msg (2)) including the session ID extracted in S42, and performs the query process on the other relay device 11-1 (S48). Here, each relay device 11 holds the query destination list 22. The query unit 15 identifies the address of the query destination on the basis of the query destination list 22, and issues the query message (msg (2)) to the address of the query destination. Thus, the query unit 15 sequentially queries the other relay devices 11-1 for the forwarding destination information.

A following method can be considered to determine that which relay device 11 the query is started from. As an example of querying the other relay devices 11, the query can be started from the first relay device 11 in the query destination list 22. As another example, the relay device 11 is selected from the query destination list 22 according to an appropriate random selection algorithm, and the query may be issued to the selected relay device 11. The process in S48 will be described with reference to FIG. 11.

The query unit 15 of the relay device 11 as the query source receives a query response message (msg (3)) from the relay device 11-1 as the query destination. If forwarding destination information cannot be acquired from the query destination as the result of the query, the query unit 15 queries the next relay device for the forwarding destination information.

The query unit 15 finishes the query when acquiring the forwarding destination information from the query destination (S48). The query unit 15 associates the destination address and the session ID with each other on the basis of the acquired forwarding destination information, and registers the associated address and ID in the forwarding destination management table 20 (S49). The request relay unit 13 determines the message destination server address from the acquired forwarding destination information (S50).

After the process in S46, S47 or S50, the transmission unit 14 transmits the request message (msg (4)) issued by the terminal 1 to the server address determined in S46, S47 or S50 (S51). The flow of the process of relaying a request message is thus finished.

Figure 11:
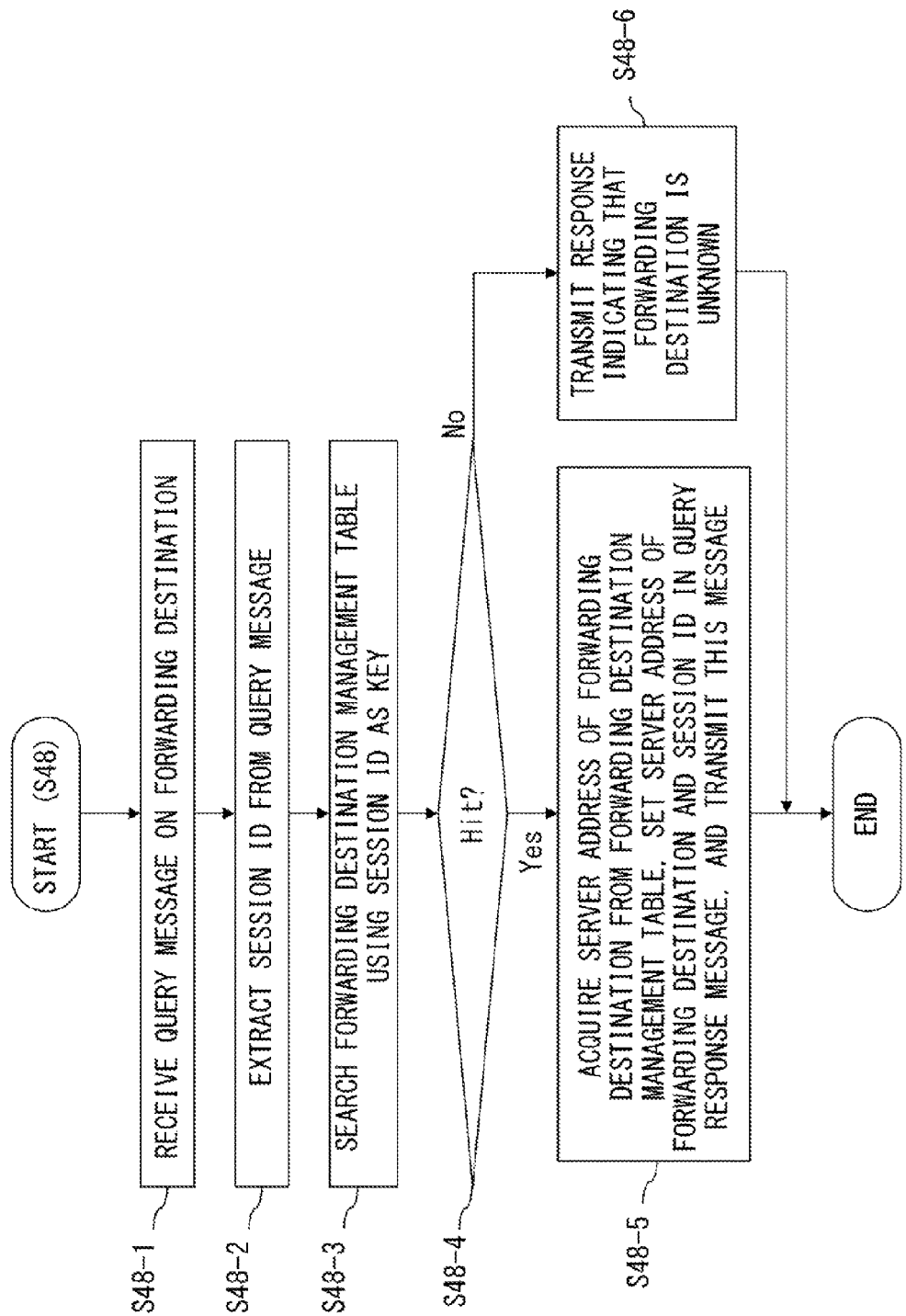
FIG. 11 depicts a process of S48 in FIG. 10 in detail.

FIG. 11 depicts the process of S48 in FIG. 10 in detail. The relay device 11-1 as the query destination receives the query message (msg (2)) on the forwarding destination information that has been issued by the relay device 11 as the query source (S48-1).

The response unit 16 of the relay device 11-1 as the query destination extracts the session ID from the query message (msg (2)) (S48-2), and searches the forwarding destination management table 20 using the session ID as a key (S48-3).

If a hit entry has been found in the forwarding destination management table 20 as a result of the search in S48-3 ("Yes" in S48-4), the response unit 16 acquires the destination server address from the entry. The response unit 16 sets the destination server address and the session ID in the query response message, and transmits this query response message to the relay device 11 as the query source (S48-5).

If no hit entry has been found in the forwarding destination management table 20 as a result of the search in S48-3 (a case of miss hit) ("No" in S48-4), the response unit 16 performs a following process. That is, the response unit 16 transmits a query response message indicating that the forwarding destination is unknown to the relay device 11 as the query source (S48-6). For instance, the query response message indicating that the forwarding destination is unknown may be a message that does not include the destination address in the query response message (msg (3)). When the relay device 11 as the query source receives the query response message indicating that the forwarding destination is unknown, this relay device 11 may query the same other relay device again or query another relay device.

FIG. 12 depicts a data structure of request message (msg (1)) (before establishment of the session) forwarded from the server load balancer to the relay device. FIG. 13 depicts an example of the request message (msg (1)) (after establishment of the session) forwarded from the server load balancer to the relay device.

Elements of FIGS. 12 and 13 and another message include the L2 header, in addition to the packet header (L3 header/L4 header), the HTTP protocol header (corresponding to the layer 7 protocol header), and the message content, as depicted in FIG. 2.

The request message (msg (1)) before establishment of the session, which is depicted in FIG. 12, corresponds to the initial request message. As depicted in FIG. 12, the MAC address (Media Access Control address) of the server load balancer is set in "Source MAC". The MAC address of the relay device 11 is set in "Destination MAC".

The IP address and the port number of the originating source terminal are set in "Source IP: Port". The IP address assigned to the relay device 11 and the port number are set in "Destination IP: Port". Description on "HTTP protocol header" and "message content" is omitted.

The request message (msg (1)) (after establishment of the session) depicted in FIG. 13 corresponds to the subsequent request message. In comparison with the request message (msg (1)) before establishment of the session, which is depicted in FIG. 12, a "Cookie" field is added to "HTTP protocol header" in FIG. 13. The session ID is set in the "Cookie" field.

FIG. 14 depicts an example of a data structure of the query message (msg (2)) transmitted from the relay device as the query source to the relay device as the query destination. The query message (msg (2)) is a message for control, which is transmitted and received between the relay devices 11.

In FIG. 14, the MAC address of the relay device 11 to be the query source of the message forwarding destination information is set in "Source MAC". The MAC address of the relay device to be the query destination for the message forwarding destination information is set in "Destination MAC". The IP address and the port number of the relay device to be the query source of the message forwarding destination information are set in "Source IP: Port". The IP address and the port number of the relay device to be the query destination for accepting a query are set in "Destination IP: Port". A "session ID" field is added to "message content" and the session ID is set in the field thereof.

FIG. 15 depicts an example of a data structure of the query response message (msg (3)) transmitted from the relay device as the query destination to the relay device as the query source. The query response message (msg (3)) is a message for control that is transmitted between the relay devices 11.

The MAC address of the relay device to be the query destination for the forwarding destination information is set in "Source MAC". The MAC address of the relay device to be the query source for the forwarding destination information is set in "Destination MAC". The IP address and the port number of the relay device to be the query destination for the forwarding destination information for accepting a query are set in "Source IP: Port". The IP address and the port number of the relay device to be the query source of the message forwarding destination information are set in "Destination IP: Port". A "session ID" field and a "destination server address" field are added to "message content". The session ID is set in the "session ID" field. The IP address of the server holding the session data identified by the session ID set in the "session ID" field are set in "destination server address".

FIG. 16 depicts an example of a data structure of the request message (msg (4)) (before establishment of the session) forwarded from the relay device to the server. FIG. 17 depicts an example of the request message (msg (4)) (after establishment of the session) forwarded from the relay device to the server.

In FIGS. 16 and 17, the MAC address of the relay device is set in "Source MAC". The MAC address of the server is set in "Destination MAC". The IP address and the port number of the relay device are set in "Source IP: Port". The IP address and the port number of the server are set in "Destination IP: Port".

In comparison with the request message (msg (1)) before establishment of the session, which is depicted in FIG. 16, a "Cookie" field is added in "HTTP protocol header" in FIG. 17. The session ID is set in the "Cookie" field.

Figure 18:
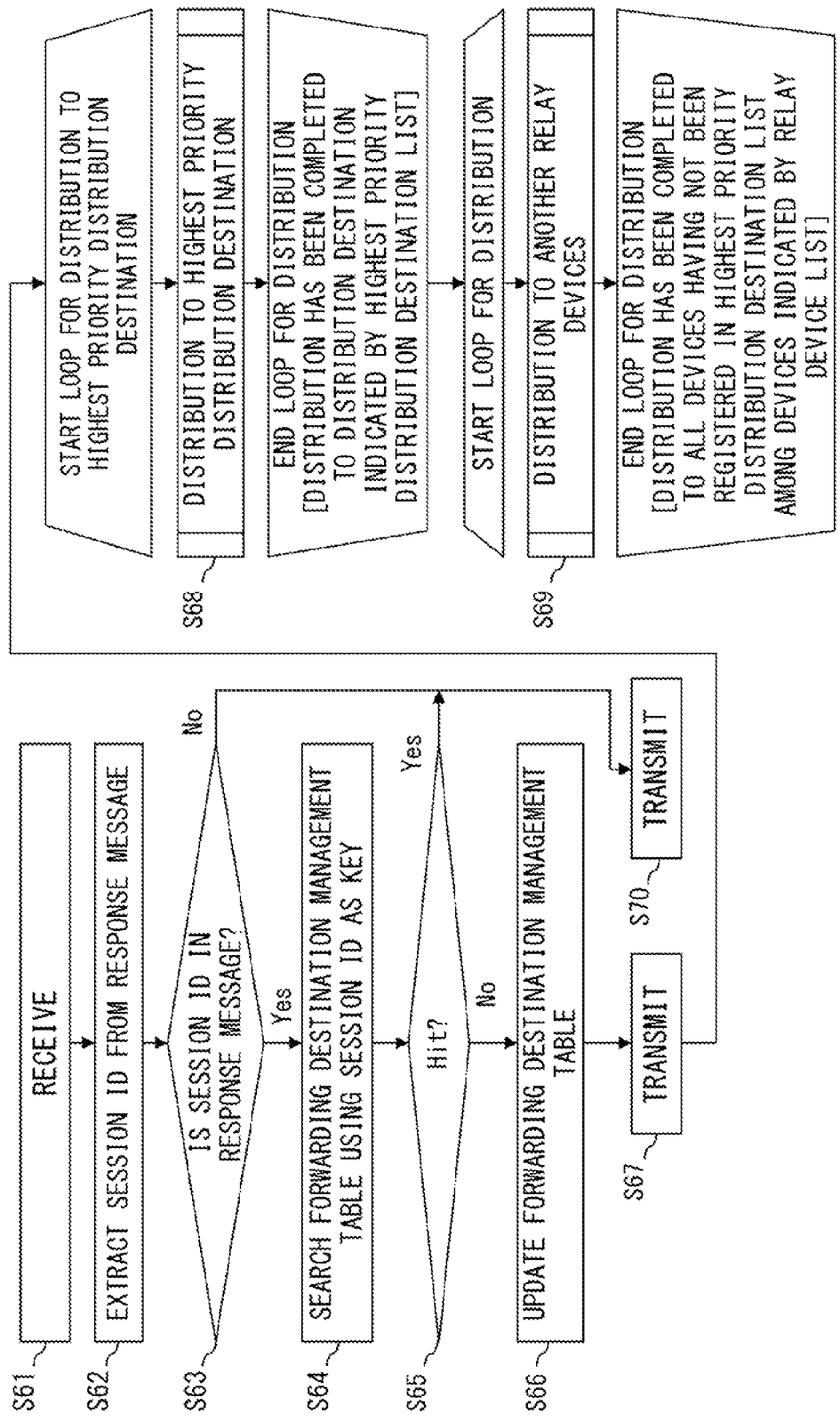
FIG. 18 depicts a flow of a process of relaying a response message in this embodiment.

FIG. 18 depicts a flow of a process of relaying a response message in this embodiment. The reception unit 12 receives the response message (msg (5)) from the server 2 (S61). The response relay unit 17 tries to extract the session ID from the layer 7 protocol header or the message content of the response message (msg (5)) (S62). If the server 2 determines that the service is required to be continued, the server 2 transmits the response message including the session ID.

The response relay unit 17 determines whether the session ID is included in the response message (msg (5)) or not (S63). If the session ID is included in the response message (msg (5)) ("Yes" in S63), the processing proceeds to S64. If the session ID is not included in the response message (msg (5)) ("No" in S63), the processing proceeds to S70.

In S70, the response relay unit 17 generates a response message (msg (6)), which is the response message (msg (5)) in which contents of the L2 header and the packet header (L3 header/L4 header) are rewritten. The transmission unit 14 transmits the response message (msg (6)) to the terminal 1.

If the session ID is included in the response message (msg (5)) ("Yes" in S63), the response relay unit 17 searches forwarding destination management table 20 using the session ID extracted in S62 as a key (S64). If an entry corresponding to the session ID is not in the forwarding destination management table 20, the response relay unit 17 determines the search is amiss hit search. Even in a case where the entry corresponding to the session ID is in the forwarding destination management table 20, if the address of the originating source server in the response message is different from that in the message destination address set in the entry, the response relay unit 17 determines the search as amiss hit search. Only if the entry corresponding to the session ID is in the forwarding destination management table 20 and the destination address matches with the address of the originating source of the response message, the response relay unit 17 determines the search is a hit search.

If the hit entry has been found in the forwarding destination management table 20 as a result of the search in S65 ("Yes" in S65), the processing proceeds to S67. If no hit entry has been found in the forwarding destination management table 20 as a result of the search in S65 (in a case of a miss hit search) ("No" in S65), the processing proceeds to S66.

In S66, the response relay unit 17 performs a process of updating the forwarding destination management table 20 using the forwarding destination information associating the session ID extracted in S62 and the address of the originating source of the response message with each other. That is, the response relay unit 17 registers the session ID extracted in S62 in the column of the session ID of the forwarding destination management table 20, and registers the address of the originating source of the response message in the column of the forwarding destination address of the forwarding destination management table 20.

Subsequently, the response relay unit 17 generates a response message (msg (6)), which is the response message (msg (5)) in which the contents of the L2 header and the packet header (L3 header/L4 header) are rewritten. The transmission unit 14 transmits the response message (msg (6)) to the terminal 1 (S67).

After the process in S67, the distribution unit 18 creates a notification message (msg (7)) for notifying the forwarding destination information, using the forwarding destination information registered in S66 and the highest priority distribution destination list 23. The distribution unit 18 distributes the created notification message (msg (7)) to the other relay devices (S68). For distributing the message, the distribution unit 18 refers to the highest priority distribution destination list 23, distributes the notification message (msg (7)) to all the relay devices 11 registered in the highest priority distribution destination list 23. At the time of completion of the distribution, the processing in S68 is finished.

The distribution unit 18 then distributes the forwarding destination information registered in S66 to the other relay devices 11 (S69). The distribution unit 18 refers to the highest priority distribution destination list 23 and the relay device list 21, and distributes the notification message (msg (7)) to all the remaining relay devices having not been registered in the highest priority distribution destination list 23 among the relay devices registered in the relay device list 21.

Figure 19:
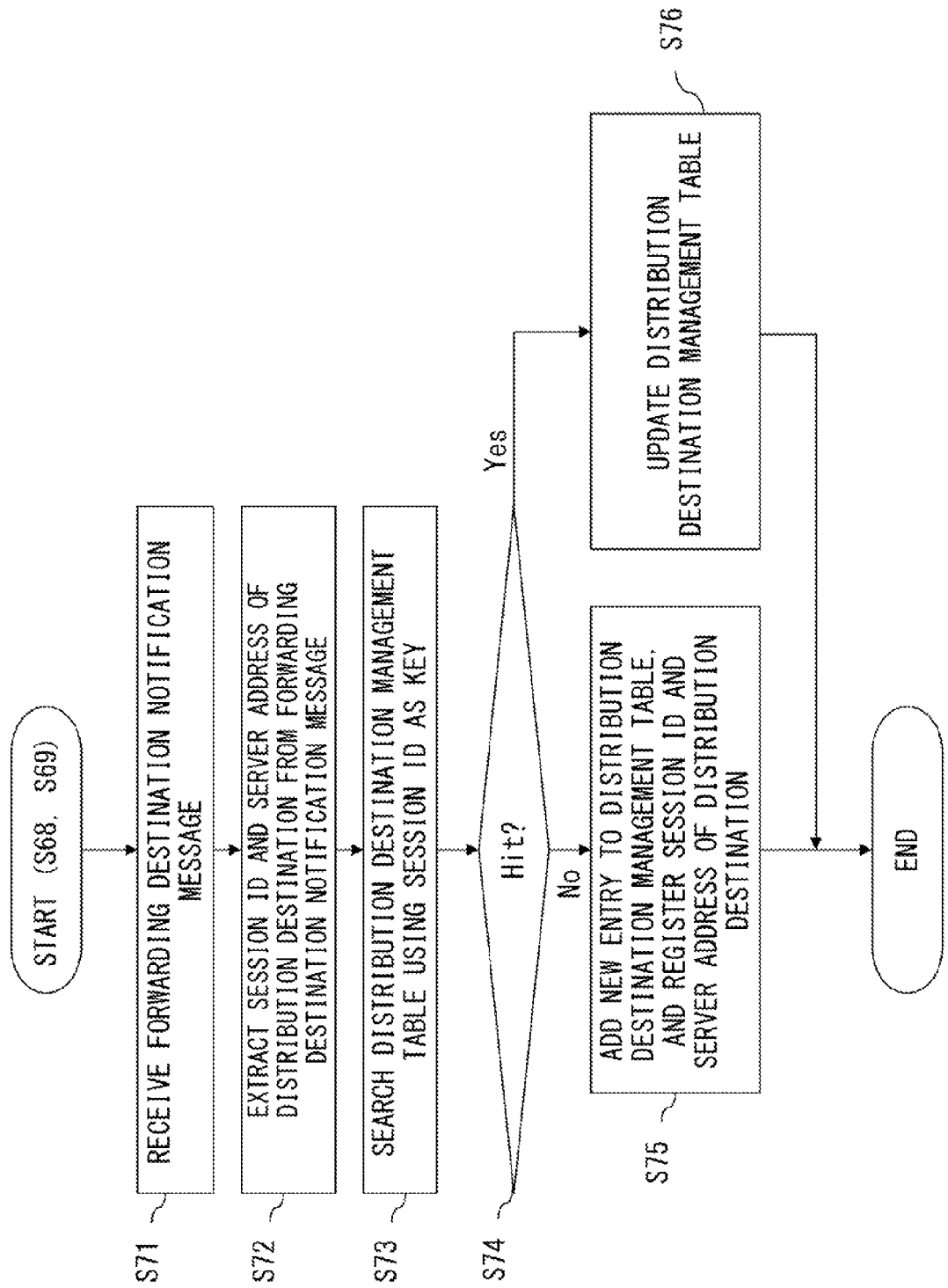
FIG. 19 depicts the process of S68 or S69 in FIG. 18 in detail.

FIG. 19 depicts the process of S68 or S69 in FIG. 18 in detail. The relay device 11-1 as the distribution destination receives the notification message (msg (7)) distributed from the relay device 11 as the distribution source (S71). The notification reception unit 19 extracts the session ID and the destination server address from the notification message (msg (7)) (S72). The notification reception unit 19 searches the forwarding destination management table 20 using the session ID as a key (S73).

If no hit entry has been found in the forwarding destination management table 20 as a result of the search in S73 ("No" in S74), the notification reception unit 19 adds a new entry to the forwarding destination management table 20. The notification reception unit 19 then registers, in the entry, the session ID and the destination server address that have been extracted in S72 (S75).

If a hit entry has been found in the forwarding destination management table 20 as a result of the search in S73 ("Yes" in S74), the notification reception unit 19 updates the destination server address of the entry (S76).

FIG. 20 depicts an example of a data structure of a response message (msg (5)) transmitted from the server to the relay device. The MAC address of the server is set in "Source MAC". The MAC address of the relay device is set in "Destination MAC". The IP address and the port number of the server are set in "Source IP: Port". The IP address and the port number of the relay device are set in "Destination IP: Port". A "Set-Cookie" field is added to "HTTP protocol header". The session ID is set in the "Set-Cookie" field.

FIG. 21 depicts an example of a data structure of a response message (msg (6)) forwarded from the relay device to the server load balancer. The MAC address of the relay device is set in "Source MAC". The MAC address of the server load balancer is set in "Destination MAC". The IP address and the port number of the relay device are set in "Source IP: Port". The IP address and the port number of the terminal are set in "Destination IP: Port". A "Set-Cookie" field is added to "HTTP protocol header". The session ID is set in the "Set-Cookie" field.

FIG. 22 depicts an example of a data structure of a notification message (msg (7)) distributed from the relay device as the distribution source to the relay device of the distribution destination. The notification message (msg (7)) is a message for control transmitted and received between the relay devices 11.

The MAC address of the relay device to be the distribution source of the message forwarding destination information is set in "Source MAC". The MAC address of the relay device to be the distribution destination of the message forwarding destination information is set in "Destination MAC". The IP address and the port number of the relay device to be the distribution source of the message forwarding destination information are set in "Source IP: Port". The IP address and the port number of relay device for accepting distribution, which is to be the distribution destination of the message forwarding destination information, are set in "Destination IP: Port".

A "session ID" field and a "destination server address" field are added to "message content". The session ID is set in the "session ID" field. The IP address of the server holding the session data identified by the session ID set in the "session ID" field is set in "destination server address".

In FIGS. 12 to 17 and 20 to 22, HTTP is assumed as the layer 7 protocol. However, a layer 7 protocol other than HTTP may be used; the message content may be disposed immediately on a TCP layer. The message can be transmitted using a communication protocol other than TCP. The communication protocol may be, for instance, UDP (User Datagram Protocol).

In comparison with a scheme of distributing the forwarding destination information to all N parallel arranged relay devices, this embodiment allows the number of set distribution destinations before transmission of the response message toward the terminal to be one, thereby enabling delay in processing for distribution to be reduced to 1/N. This advantageous effect increases with increase in degree of parallelism of the relay devices, that is, the number of the relay devices.

The number of relay devices having the forwarding destination information before transmission of the response message is one. Accordingly, in relaying, when the relay device without the forwarding destination information receives the subsequent message, a possibility occurs of delay due to query process to another relay device. However, in this embodiment, the forwarding destination information is distributed and the query is controlled. Accordingly, delay due to the query process can be minimized. This allows the delay time caused owing to the relay process as a whole to be reduced in this embodiment.

Variations of examples of method of selecting the relay device as the distribution destination/query destination will hereinafter be described. Processes which will be described below are analogous to the aforementioned details, unless specifically mentioned.

Example 1

Example 1 will be described that is an example in which the relay devices to be the distribution destinations and the query destinations of the forwarding destination information have preliminarily been determined. In Example 1, elements having configurations and functions identical to those described above are assigned with the identical symbols, and description thereof is omitted.

Figure 23:
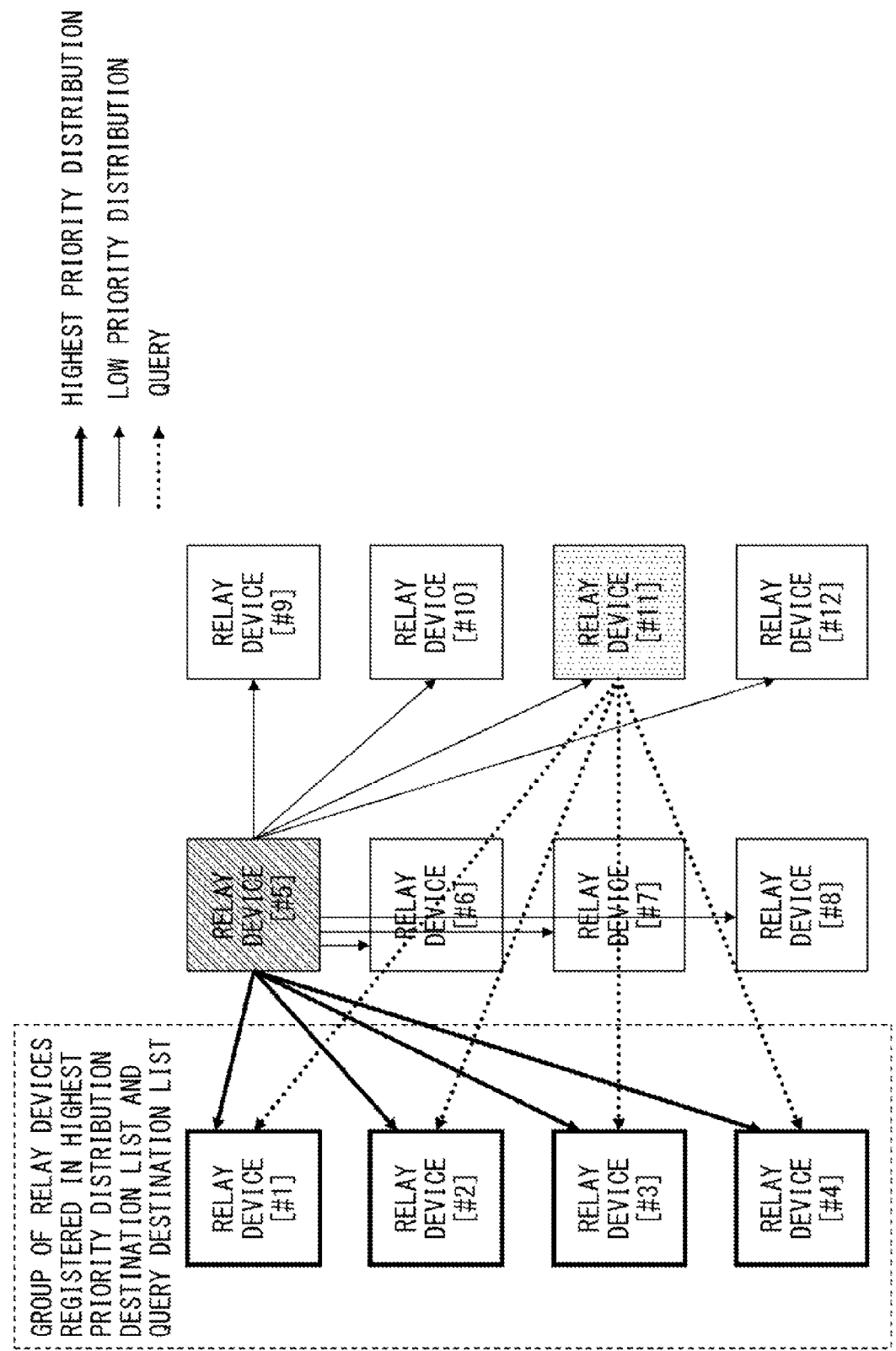
FIG. 23 depicts an example of a configuration of a message relay system in Example 1.

FIG. 23 depicts an example of a configuration of a message relay system in Example 1. FIG. 24A depicts an example of highest priority distribution destination list in Example 1. FIG. 24B depicts an example of query destination list in Example 1. A highest priority distribution destination list 23 and a query destination list 22, which are common lists and depicted in FIGS. 24A and 24B, are preset in each relay device in the message relay system. The configurations of the relay devices (#1) to (#12) in FIG. 23 are identical to the configuration in FIG. 5.

In FIG. 23, it is assumed that the relay device (#5) is in charge of a process of relaying the initial request issued by the terminal 1 and the response message (including the session ID) when the session is established. In this case, the relay device (#5) returns, to the terminal 1, the response message responsive to the initial request (S67 in FIG. 18). Subsequently, the relay device (#5) distributes forwarding destination information to the relay devices (#1 to #4) set in the highest priority distribution destination list 23, as depicted by arrows (thick lines) (S68 in FIG. 18).

Subsequently, as indicated by arrows (normal), the relay device (#5) distributes the forwarding destination information to the relay devices (low priority distribution destinations) (#6 to #12), which are other than the relay devices (#1 to #4) set in the highest priority distribution destination list 23 (S69 in FIG. 18). The distribution of the forwarding destination information to the low priority distribution destinations is performed when the relay device (#5) does not perform another process more prior thereto.

Here, it is assumed that, before the forwarding destination information is distributed to the low priority distribution destination, the relay device of the low priority distribution destination (#11 in the case in FIG. 23) receives the subsequent request message including the session ID. The relay device (#11) then performs the flow of the request message relay process of FIG. 10. The relay device (#11) does not have the message forwarding destination information on the session ID, in the forwarding destination management table. In this case, as indicated by arrows (dotted lines), the relay device (#11) sequentially queries the relay devices (#1 to #4) for the forwarding destination information on the basis of the query list 22 (S48 in FIG. 10).

Accordingly, the relay device (#11) can acquire the forwarding destination information corresponding to the session ID and forward the subsequent request message to the server indicated by the forwarding destination information (S49-51 in FIG. 10).

In a case of significantly heavy communication traffic, a state is assumed in which the relay device (#5) performs a process with a high priority but cannot perform a process with a low priority. In this case, the relay device (#5) may perform the process with a high priority and the process with a low priority at a prescribed ratio. For instance, the relay device (#5) may perform the process with a low priority once after performing the process with a high priority ten times.

In FIG. 18, in the message relay system including twelve relay devices, the relay devices to which the distribution is preferentially performed are four devices #1 to #4. The number of devices may be one or set to a number more than four.

Example 2

In Example 2 will be described that is an example in which the relay devices as the distribution destinations and the query destinations of the forwarding destination information are preliminarily determined and the query destination differ from group to group, to which the message relay devices are belong. In Example 2, elements having configurations and functions identical to those described above are assigned with the identical symbols, and description thereof is omitted.

In the case of Example 1, the sequence on the basis of which the relay devices set in the query destination list are queried is according to the query algorithms in the respective relay devices as described with reference to S 48 in FIG. 10. Accordingly, there is a possibility that queries concentrate on the specific relay device.

Thus, in Example 2, the relay devices included in the relay system are divided into groups; at least one relay device to be the highest priority distribution destination is provided in each group. Further, the relay device as the highest priority distribution destination is written in the query destination lists in the relay devices in each group. This allows the query load to be distributed among the relay devices.

FIG. 25 depicts an example of a configuration of a message relay system in Example 2. FIGS. 26A, 26B and 26C depict examples of the highest priority distribution destination lists and the query destination lists set in the relay devices in each group in Example 2. The configurations of the relay devices (#1) to (#12) in FIG. 25 are identical to the configuration in FIG. 5. In Example 2, elements having configurations and functions identical to those described above are assigned with the identical symbols, and description thereof is omitted.

In FIG. 25, the relay devices in the message relay system are classified into groups #A, #B and #C. The relay devices (#1 to #4) belong to the group #A. The relay devices (#5 to #8) belong to the group #B. The relay devices (#9 to #12) belong to the group #C.

The highest priority distribution destination list 23a and the query destination list 22a depicted in FIG. 26A are preliminarily set in the relay devices (#1 to #4) belonging to the group #A. The highest priority distribution destination list 23b and the query destination list 22b depicted in FIG. 26B are preliminarily set in the relay devices (#5 to #8) belonging to the group #B. The highest priority distribution destination list 23c and the query destination list 22c depicted in FIG. 26C are preliminarily set in the relay devices (#9 to #12) belonging to the group #C.

In FIG. 25, it is assumed that the relay device (#3) is in charge of the process of relaying the initial request issued by the terminal 1 and the response message (including the session ID) on establishment of the session. In this case, the relay device (#3) returns, to the terminal 1, the response message responsive to the initial request (S67 in FIG. 18). Subsequently, as indicated by arrows (thick lines), the relay device (#3) distributes the forwarding destination information to the relay devices (#1, #5 and #9) set in the highest priority distribution destination list 23a (S68 in FIG. 18). Subsequently, as indicated by arrows (normal), the relay device (#3) distributes the notification message including the forwarding destination information to the relay devices (the relay devices of the low priority distribution destinations) other than the relay devices (#1, #5 and #9) set in the highest priority distribution destination list 23 (S69 in FIG. 18). The distribution of the forwarding destination information to the low priority distribution destination is performed when the relay device (#3) does not perform another process more prior thereto.

Here, it is assumed that before the forwarding destination information is distributed, the relay device of the low priority distribution destination (#11 in the case in FIG. 23) receives the subsequent request message including the session ID. The relay device (#11) then performs the flow of the request message relay process of FIG. 10. The relay device (#11) does not have the forwarding destination information on the session ID, in the forwarding destination management table. In this case, as indicated by the arrows (dotted lines), the relay device (#11) queries the relay device (#9) for the message forwarding destination information on the basis of the query list 22c (S48 in FIG. 10).

Accordingly, the relay device (#11) can acquire the forwarding destination information corresponding to the session ID, and forward the subsequent request message to the server indicated by the forwarding destination information (S49-51 in FIG. 10).

In a case of significantly heavy communication traffic, a state is assumed in which the relay device (#3) performs a process with a high priority but cannot perform a process with a low priority. In this case, the relay device (#3) may perform the process with a high priority and the process with a low priority at a prescribed ratio. For instance, the relay device (#3) may perform the process with a low priority once after performing the process with a high priority ten times.

Example 3

In Example 2, the distribution of the forwarding destination information to the relay device as the highest priority distribution destination, and the distribution of the forwarding destination information to the remaining relay devices are performed by one relay device having processed the request and response messages on the establishment of the session. In this scheme, it takes time until the forwarding destination information is distributed to all the relay devices in the message relay system. Accordingly, the probability that a query is issued to another relay device when the subsequent request message reaches any of the relay devices increases. As a result, the average delay in response as a whole increases.

Thus, in Example 3, the relay device as the highest priority distribution destination is in charge of distributing the forwarding destination information to the relay devices other than the relay device as the highest priority distribution destination in each group, thereby performing a distribution process in a distributed manner. In Example 3, elements having configurations and functions identical to those described above are assigned with the identical symbols, and description thereof is omitted.

FIG. 27 depicts an example of a configuration of a message relay system in Example 3. In contrast to the case in FIG. 25, in FIG. 27 the relay devices as the highest priority distribution destinations (#1, #5 and #9) distribute the forwarding destination information to the other relay devices in the group to which the distributing devices themselves belong. In FIG. 27, a group-device list 24 is set in the relay devices as the highest priority distribution destinations (#1, #5 and #9).

Figure 28:
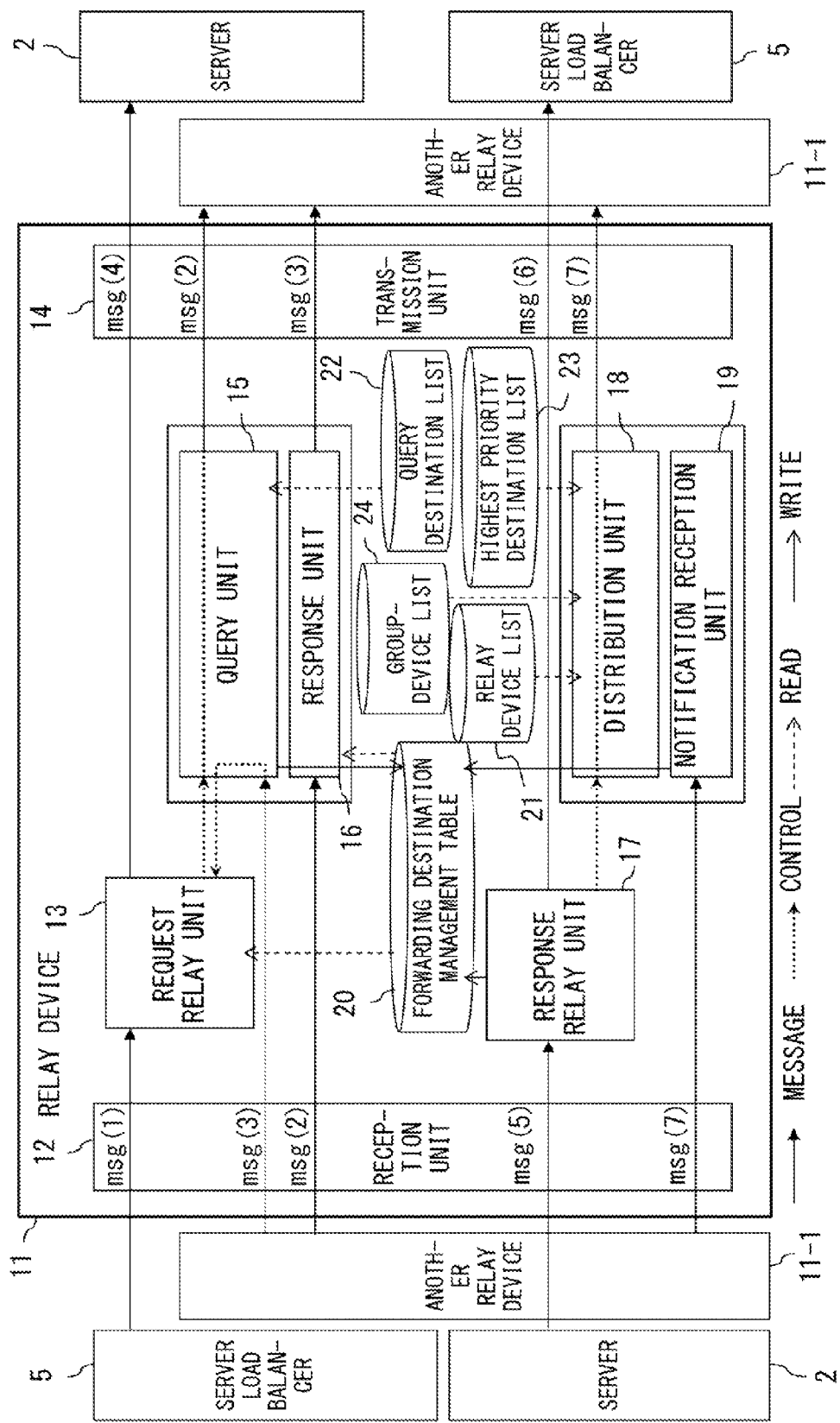
FIG. 28 depicts an example of a relay device as the highest priority distribution destination in Example 3.

FIG. 28 depicts an example of a relay device as the highest priority distribution destination in Example 3. The relay device in FIG. 28 is the relay device in FIG. 5 to which the group-device list 24 is added. In Example 3, the highest priority distribution destination list 23 and the query destination list 22 set in the relay devices in each group are analogous to those in FIGS. 26A, 26B and 26C. Further, the relay devices other than the relay device as the highest priority distribution destination are analogous to the configuration in FIG. 5.

FIG. 29 depicts an example of a group-device list in Example 3. The group-device list 24 is a list in which the addresses of the relay devices belonging to the group are listed.

Figure 30:
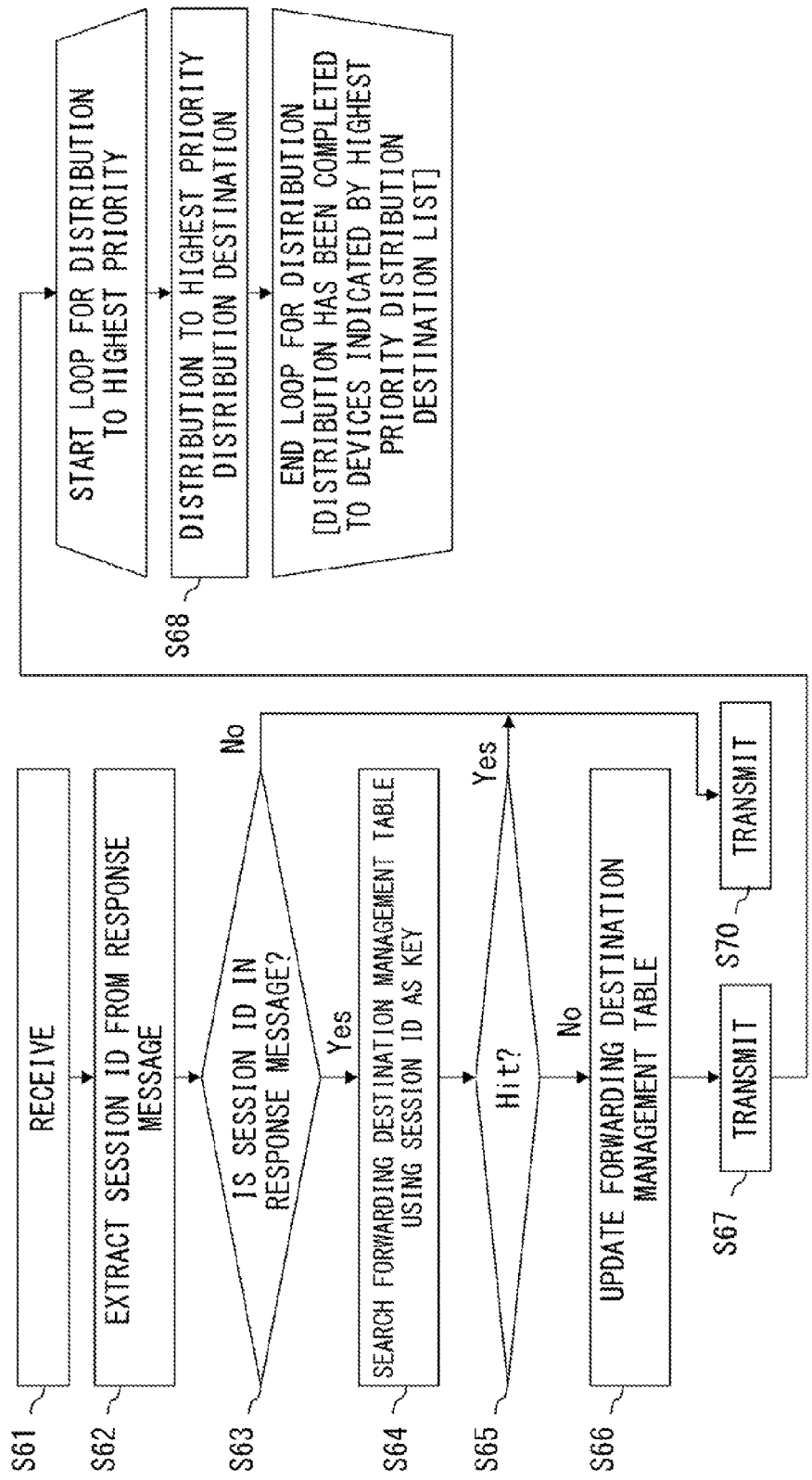
FIG. 30 depicts a flow of a process of relaying a response message in Example 3.

FIG. 30 depicts a flow of a process of relaying a response message in Example 3. The flow in FIG. 30 is the flow in FIG. 18 from which the loop process in S69 is removed. In FIG. 27, it is assumed that the relay device (#3) is in charge of the process of relaying the initial request issued by the terminal 1 and the response message (including the session ID) on establishment of the session. In this case, the relay device (#3) returns, to the terminal 1, the response message responsive to the initial request (S67 in FIG. 18). Subsequently, the relay device (#3) distributes the forwarding destination information to the relay devices (#1, #5 and #9) set in the highest priority distribution destination list 23a (S68 in FIG. 18).

Figure 31:
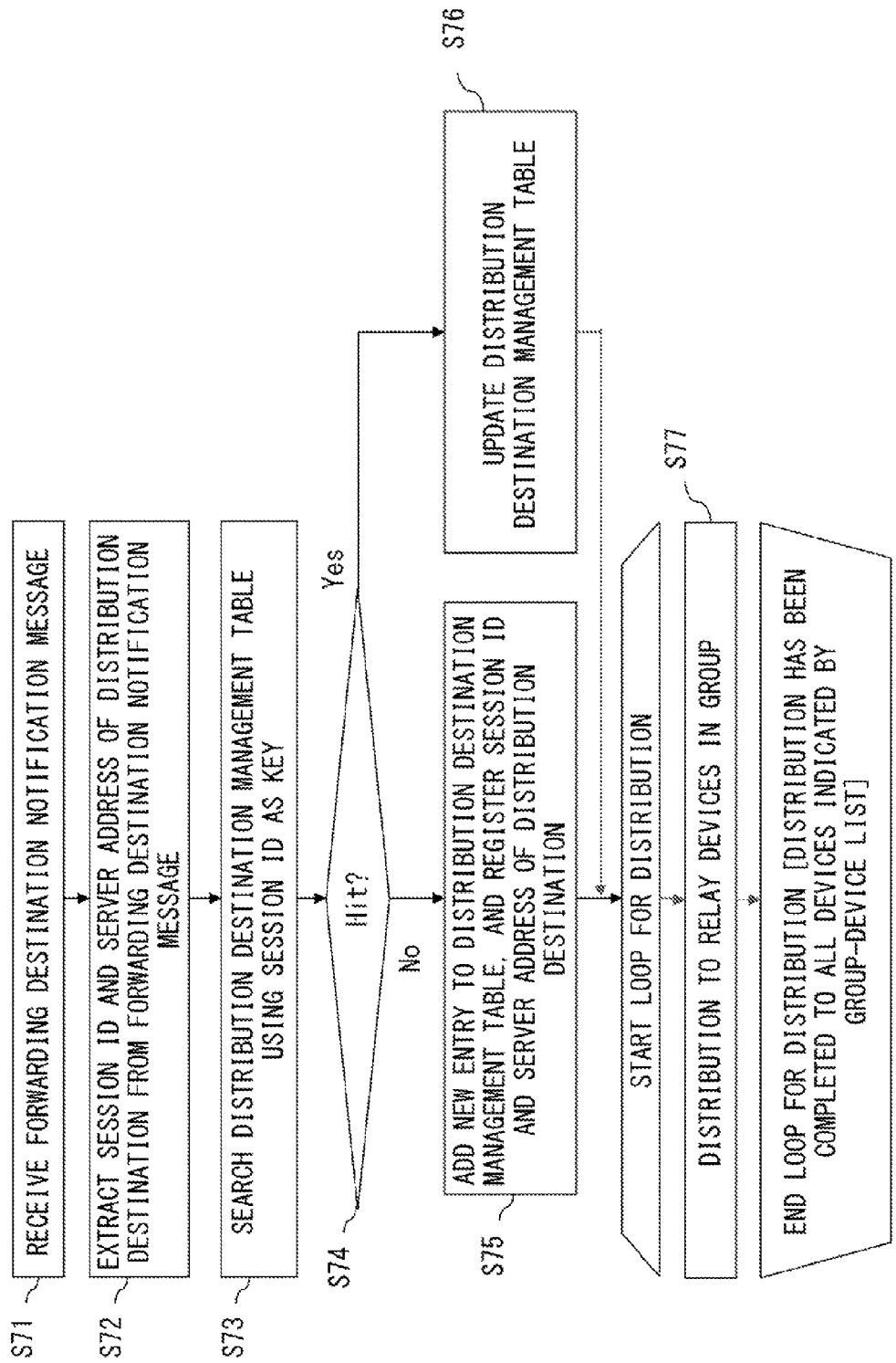
FIG. 31 depicts a process of distributing the forwarding destination information to the relay devices in the group by the relay device as the highest priority distribution destination in Example 3.

FIG. 31 depicts a process of distributing the forwarding destination information to the relay devices in the group by the relay device as the highest priority distribution destination in Example 3. The flow of FIG. 31 is the flow of FIG. 19 to which a loop process in S77 is added.

The relay devices as the highest priority distribution destinations (#1, #5 and #9) in the respective groups receive the notification message (msg (7)) distributed from the relay device (#3) (S71). The notification reception units 19 in the relay devices (#1, #5 and #9) extract the session ID and the destination server address from the notification message (msg (7)) (S72). The notification reception unit 19 searches the forwarding destination management table 20 using the session ID as a key (S73).

As a result of the search in S73, if no hit entry has been found in the forwarding destination management table 20 ("No" in S74), the notification reception unit 19 adds a new entry to the forwarding destination management table 20. The notification reception unit 19 registers the session ID and the destination server address extracted in S72 to the entry (S75).

As a result of the search in S73, if a hit entry has been found in the forwarding destination management table 20, the notification reception unit 19 updates the destination server address in the entry (S76).

After completion off S75 or S76, the distribution units 18 in the relay devices (#1, #5 and #9) distribute the notification message including the forwarding destination information to the relay devices in the group that are set in the group-device list (S77).

The distribution of the forwarding destination information to the low priority distribution destinations is performed when the relay devices (#1, #5 and #9) do not perform another process more prior thereto. In a case of significantly heavy communication traffic, a state is assumed in which the relay devices (#1, #5 and #9) perform a process with a high priority but cannot perform a process with a low priority. In this case, the process with a high priority and the process with a low priority may be performed at a prescribed ratio (e.g. the process with a low priority is performed once after the process with a high priority is performed ten times).

Example 4

In Examples 1 to 3, there is a possibility that the processing loads on the relay devices to be the priority destinations and the query destinations become high. Accordingly, there is a possibility that the processing in the relay devices to be the priority destinations and the query destinations becomes a bottleneck in processing performance of the system. Thus, in Example 4, the relay devices to be the distribution and query destinations are widened to all the relay devices, and the relay devices to be the priority destinations and the query destinations are determined for each session ID. In Example 4, elements having configurations and functions identical to those described above are assigned with the identical symbols, and description thereof is omitted.

FIG. 32 depicts an example of a relay device in Example 4. The relay device in FIG. 32 is the relay device in FIG. 5 to which a calculation unit 25 is added.

It is assumed that the number of relay devices 11 is N, and these devices are assigned with respective device numbers 0 to N−1. In the relay device 11 having processed the initial request and the response message for establishing the session, the calculation unit 25 performs following processes. When the forwarding destination information is distributed, the calculation unit 25 acquires a hash value H representing the session ID by inputting the session ID into a hash function. The calculation unit 25 then performs an operation of H mod N, determines that the relay devices having the device number identical to a numerical value k (0≤k<N) acquired as the result is the highest priority distribution destination, and distributes the forwarding destination information.

When the query for the forwarding destination information is issued, the request message is assigned with the session ID. Accordingly, the calculation unit 25 acquires the hash value H by inputting the session ID into the hash function as with the case of distribution. The calculation unit 25 then performs the operation of H mod N, and queries the relay device having the device number identical to the numerical value k (0≤k<N) acquired as the result.

As long as data has the identical session ID, the hash value H acquired by inputting the data into the hash function is identical, and the numerical value k acquired by performing the H mod N operation is also identical. Accordingly, the relay device as the highest priority distribution destination and the relay device as the query destination for the identical session ID match with each other.

Figure 33:
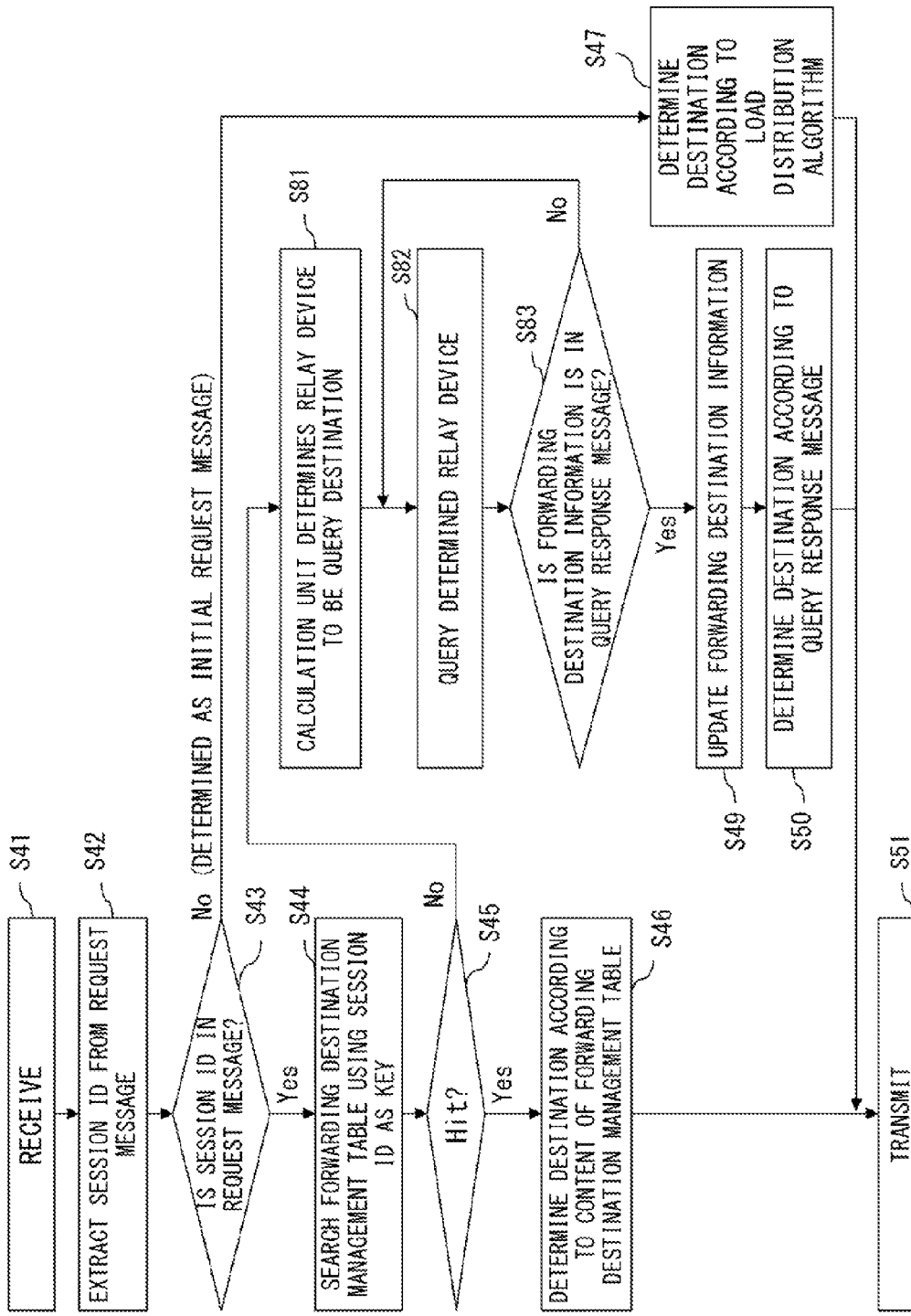
FIG. 33 depicts a flow of a process of relaying a request message in Example 4.

FIG. 33 depicts a flow of a process of relaying a request message in Example 4. The flow of FIG. 33 is the flow of FIG. 10 in which the loop process in S48 is replaced with processes in S81 to S83.

If no hit entry has been found in the forwarding destination management table 20 as a result of the search in S44 ("No" in S45), the calculation unit 25 determines the relay device to be the query destination using the hash function as described above (S81). That is, the calculation unit 25 acquires the hash value H by inputting the session ID extracted in S42 into the hash function. The calculation unit 25 then performs the operation of H mod N, and determines that the relay device having the device number identical to the numerical value k (0≤k<N) acquired as the result.

The query unit 15 issues a query message (msg (2)) including the session ID extracted in S42 to the relay device determined as the query destination, thereby performing the query process (S82).

If the forwarding destination information has not been acquired from the query destination as the result of the query ("No" in S83), the query unit 15 queries again the relay device determines as the query destination.

If forwarding destination information has been acquired from the query destination as the result of the query ("Yes" in S83), the query unit 15 associates the acquired forwarding destination information with the session ID, and registers the associated information and ID in the forwarding destination management table 20 (S49). The request relay unit 13 determines the acquired forwarding destination information as the message destination server address (S50). Processes thereafter are identical to those in FIG. 10. Accordingly, the description thereof is omitted.

Figure 34:
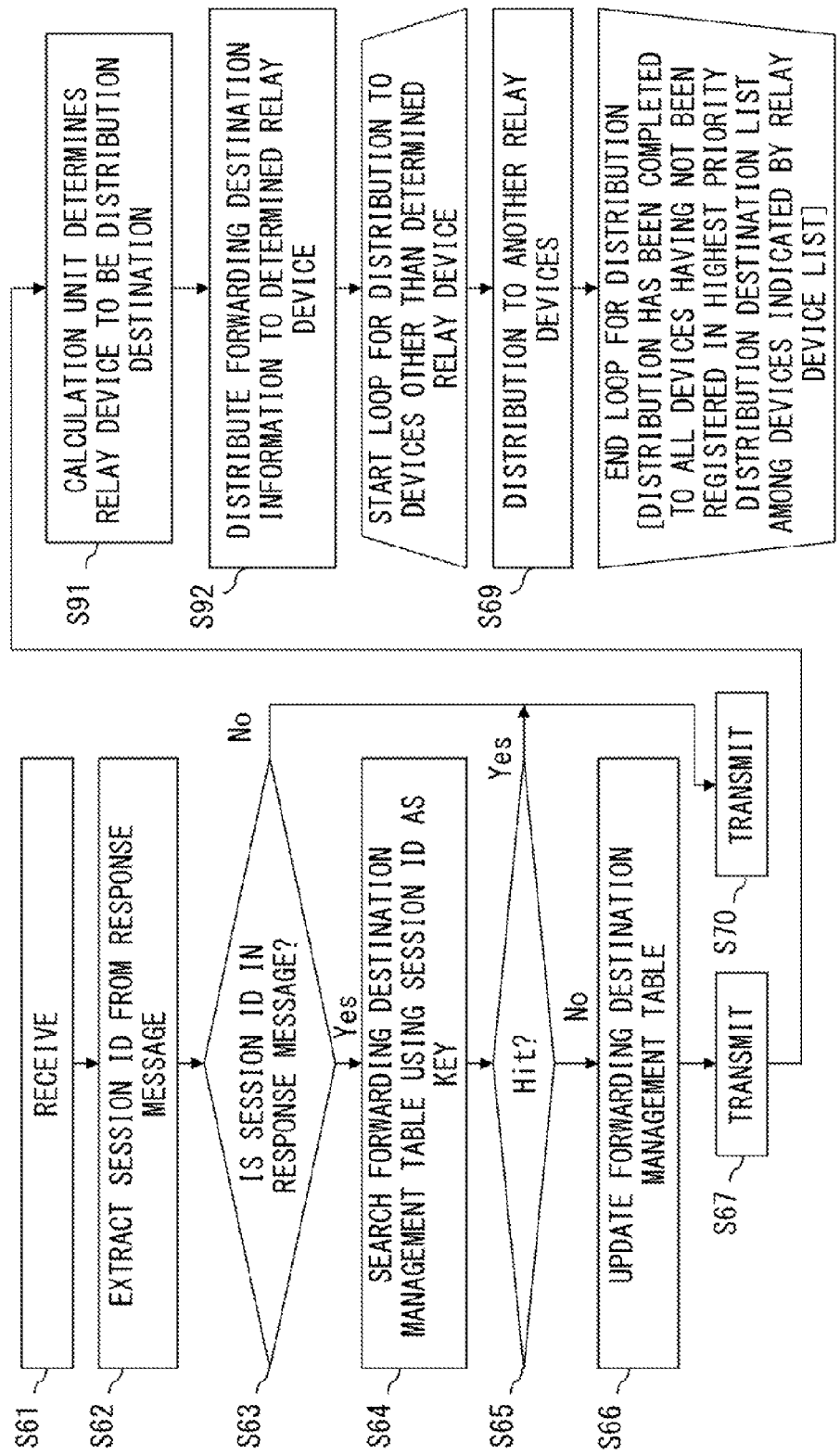
FIG. 34 depicts a process of relaying a response message in Example 4.

FIG. 34 depicts a flow of process of relaying a response message in Example 4. The flow of FIG. 34 is the flow of FIG. 18 in which the loop process in S68 is replaced with processes in S91 and S92.

After the process in S67, the calculation unit 25 determines the relay device to be the distribution destination using the hash function as described above (S91). More specifically, the calculation unit 25 acquires the hash value H by inputting the session ID extracted in S62 into the hash function. The calculation unit 25 then performs the operation of H mod N, and determines the relay device having the device number identical to the numerical value k (0≤k<N) acquired as the result as the distribution destination.

The distribution unit 18 creates the notification message (msg (7)) using the forwarding destination information registered in S66 and the address information of the determined distribution destination, and distributes the notification message (msg (7)) to the relay device to be the distribution destination (S92). Processes thereafter are identical to those in FIG. 18. Accordingly, the description thereof is omitted.

Example 5

In Example 4, queries with the identical session ID concentrate on one message relay device (device number k). Accordingly, there is a possibility that the load on this device cause a problem. Thus, in addition to the relay device k to be the highest priority distribution destination determined on the basis of the session ID, using the hash function, the message relay devices having the device numbers k+1, k+2, . . . , k+n are added as the highest priority distribution destinations and the query destinations. When the query is issued, an arbitrary relay device is selected from the query destination list created on the basis of the session ID, the selected relay device is queried for the forwarding destination information. In Example 5, the elements having configurations and functions identical to those described above are assigned with the identical symbols, and description thereof is omitted.

Figure 35:
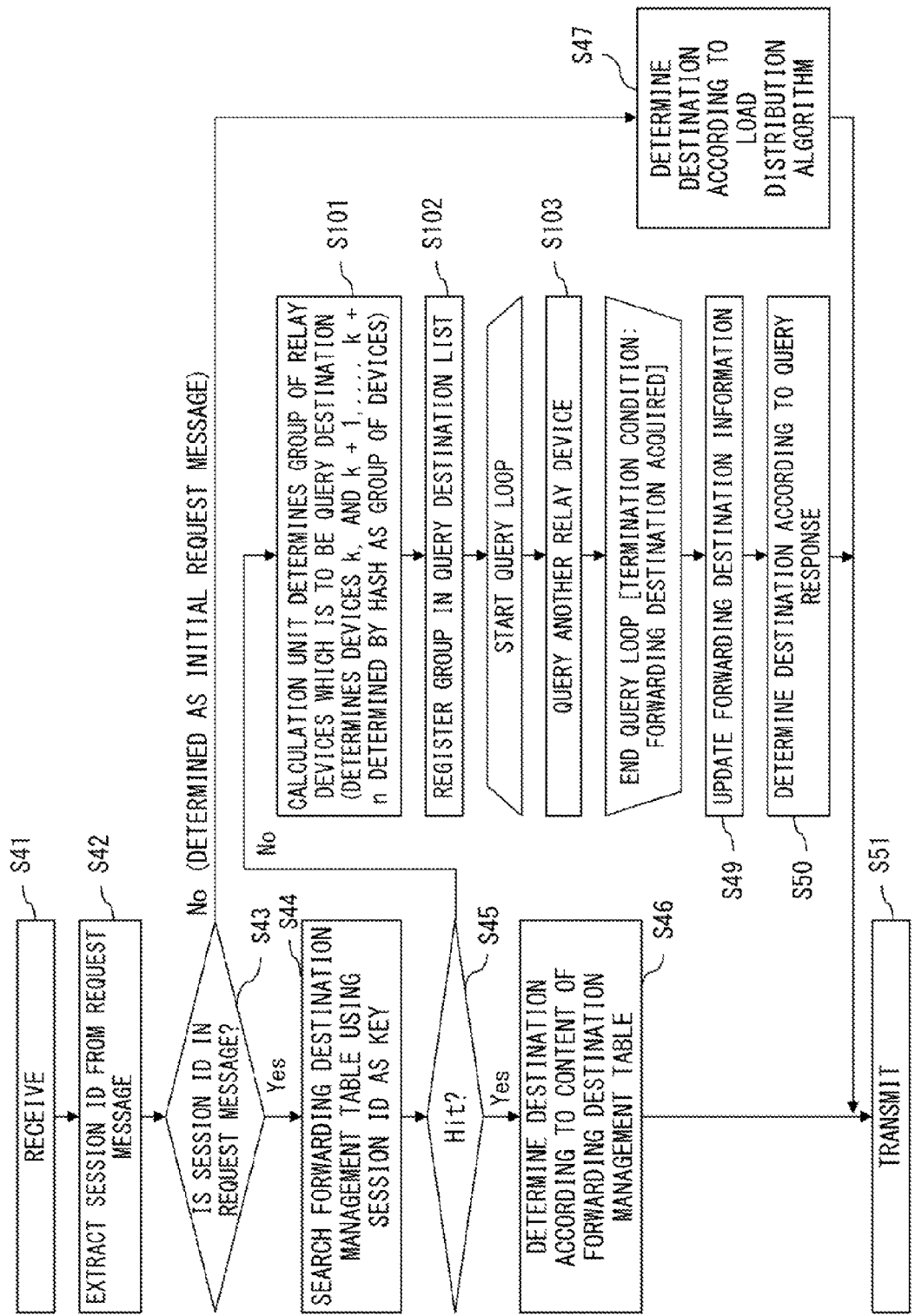
FIG. 35 depicts a flow of a process of relaying a request message in Example 5.

FIG. 35 depicts a flow of a process of relaying a request message in Example 5. The flow of FIG. 35 is the flow of FIG. 10 in which the loop process in S48 is replaced with processes in S101 to S103. In Example 5, at the initial stage, the query destination list 22 does not store the address of the relay device as the query destination.

If no hit entry has been found in the forwarding destination management table 20 as the result of the search in S44 ("No" in S45), the calculation unit 25 determines the group of relay devices using the hash function as described above (S101). That is, the calculation unit 25 acquires the hash value H by inputting the session ID extracted in S42 into the hash function. The calculation unit 25 then performs the operation of H mod N, and determines that the relay devices having the device number identical to the hash value ($0 \leq k < N$) acquired as the result is the query destinations. Further, the calculation unit 25 determines the relay devices having the device numbers k+1, k+2, ..., k+n as the query destinations.

The calculation unit 25 registers the addresses of the relay devices having the device numbers k, k+1, k+2, ..., k+n in the destination list 22 (S102).

The query unit 15 issues the query message (msg (2)) including the session ID extracted in S42 to the relay devices registered in the query destination list 22, thus performing the query process (S103). The process in S103 is identical to that in S48 in FIG. 10. Processes thereafter are identical to those in FIG. 10. Accordingly, the description thereof is omitted.

Figure 36:
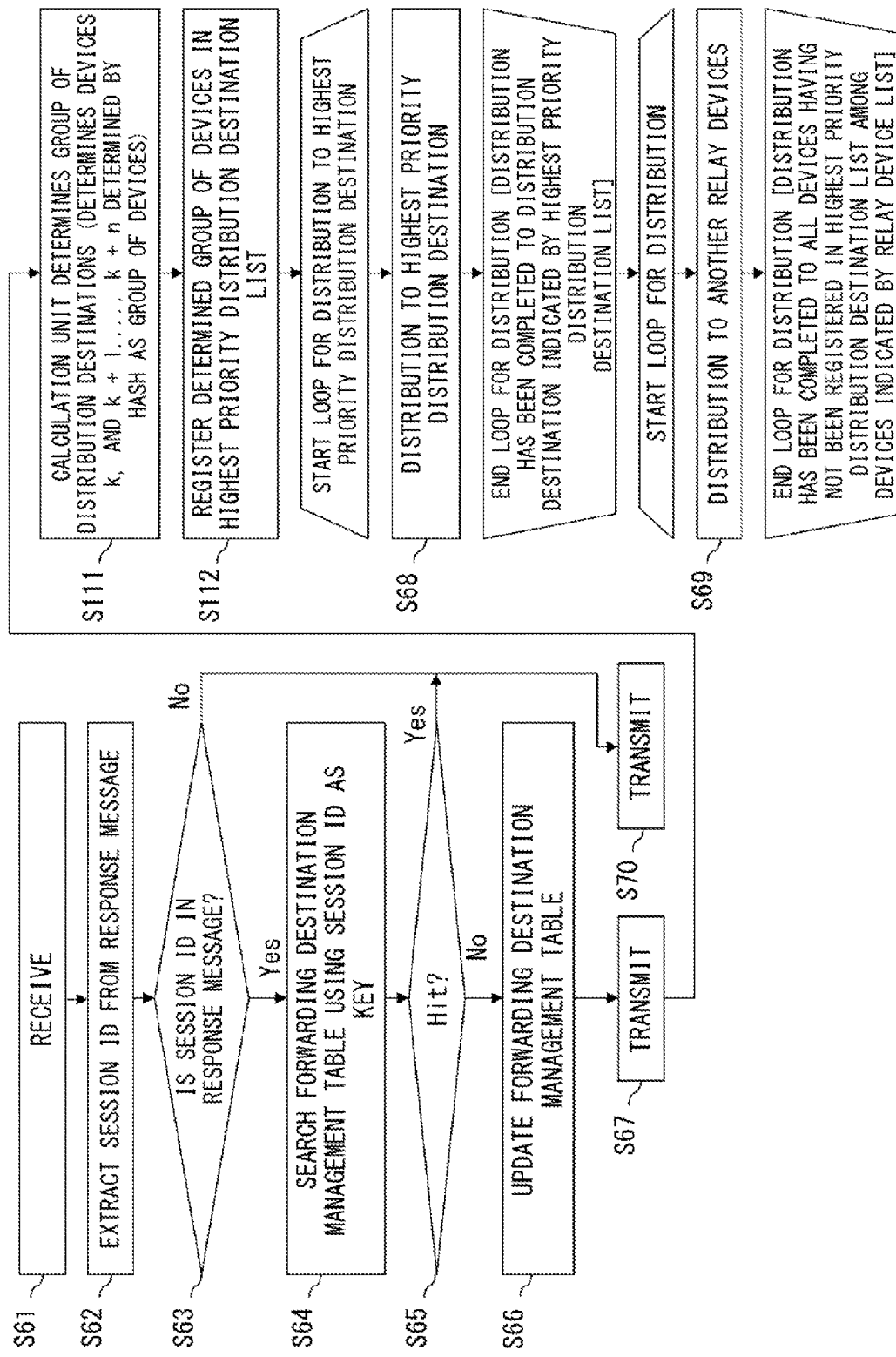
FIG. 36 depicts a flow of a process of relaying a response message in Example 5.

FIG. 36 depicts a process of relaying a response message in Example 5. The flow of FIG. 36 is the flow of FIG. 18 in which processes in S111 and S112 are added before the loop process in S68. In Example 5, at the initial stage, the highest priority distribution destination list 23 does not store the address of the relay device as the distribution destination.

After the process in S67, the calculation unit 25 determines the group of relay devices which is to be the distribution destinations using the hash function as described above (S111). More specifically, the calculation unit 25 acquires the hash value H by inputting the session ID extracted in S62 into the hash function. The calculation unit 25 then performs the operation of H mod N, and determines that the relay device having the device numbers identical to the numerical value k ($0 \leq k < N$) acquired as the result is the distribution destination as the distribution destination. Further, the calculation unit 25 determines the relay devices having the device numbers k+1, k+2, ..., k+n as the distribution destinations.

The calculation unit 25 registers the addresses of the relay devices having the device numbers k, k+1, k+2, ..., k+n in the highest priority distribution destination list 23 (S112).

After the process in S112, the distribution unit 18 creates the notification message (msg (7)) using the forwarding destination information registered in S66 and the highest priority distribution destination list 23, and distributes the notification message (msg (7)) to the other relay devices (S68). Processes thereafter are identical to those in FIG. 18. Accordingly, the description thereof is omitted.

Example 6

When the query is issued in Example 5, the process of selecting the relay device to be an actual query target from the query destination list is independently performed by each relay device. Accordingly, when all the relay devices in charge of queries perform the queries from the top of the list, the query loads concentrate on one relay device.

Thus, in Example 6, a query destination selection logic is specified so as to distribute queries to the query destination to a certain extent. For instance, it is assumed that the number of relay devices registered in the query destination list 22 is n (n is an arbitrary integer). In this case, the relay device as the query source performs an operation of (m mod n)+1, where m is the device number of this device itself (m is an arbitrary integer), and thereby acquires a numerical value q ($1 \leq q \leq n$). The relay device as the query source then performs queries for the forwarding destination information, starting from the relay device registered as a q-th entry of the query destination list 22 and according to the sequence of registration in the list. After completion of the query to the address registered at the bottom of the list, queries are performed from the top of the list.

In Example 6, elements having configurations and functions identical to those described above are assigned with the identical symbols, and description thereof is omitted.

Figure 37:
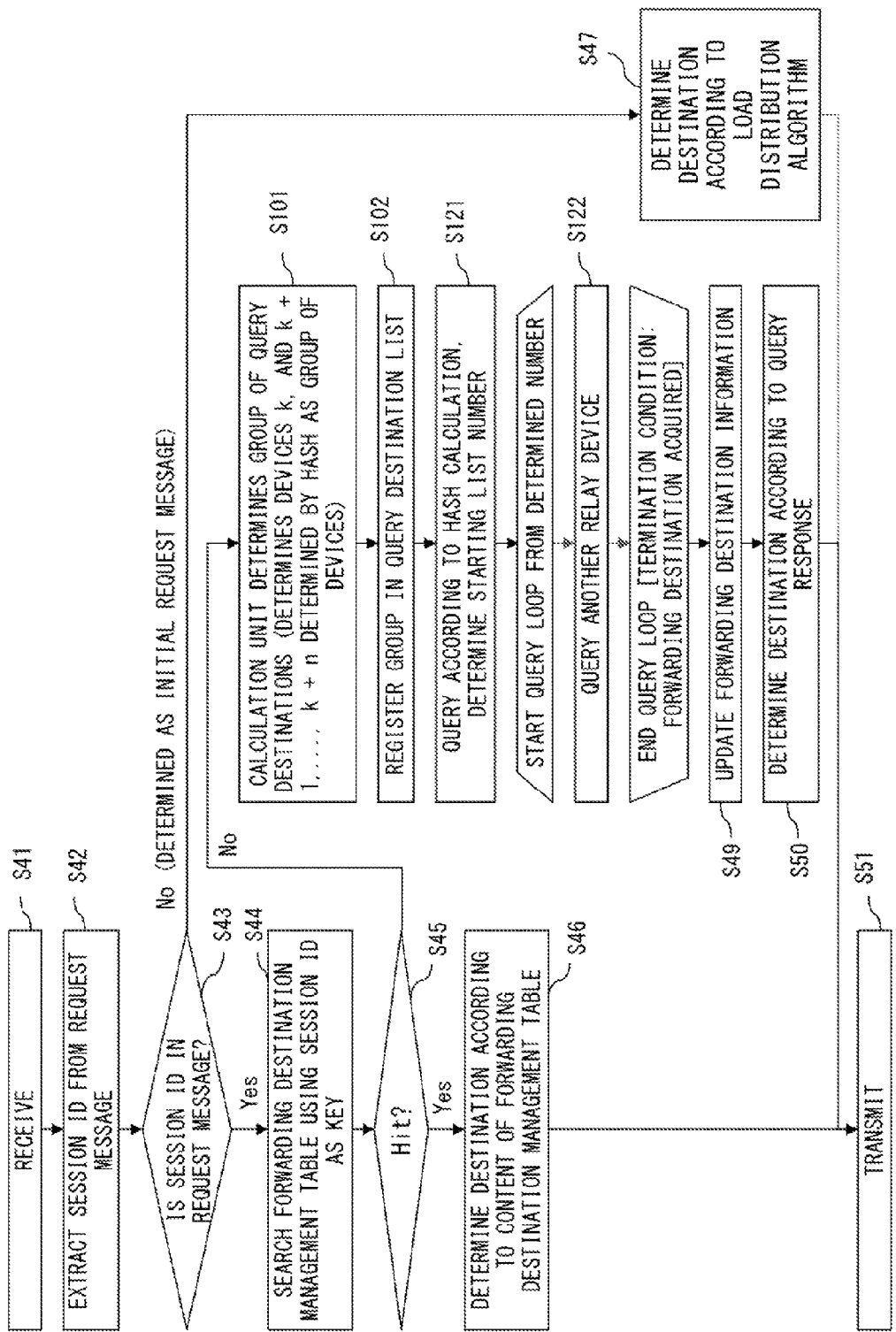
FIG. 37 depicts a flow of a process of relaying a request message in Example 6.

FIG. 37 is a flow of a process of relaying a request message in Example 6. The flow of FIG. 37 is the flow of FIG. 35 in which the processes in S102 and S103 are replaced with processes in S121 and S122.

The calculation unit 25 registers the address of the relay devices having device numbers k, k+1, k+2, ..., k+n in the query destination list 22 (S102).

Subsequently, the calculation unit 25 determines the list number from which the query is started, from the query destination list 22, using the hash calculation (S121). Here, the list number is one of numbers sequentially assigned to the entries registered in the query destination list 22 from the top of the query destination list 22.

The query unit 15 issues the query messages (msg (2)) including the session ID extracted in S42 to the relay devices registered in the query destination list 22, sequentially from the relay device with the determined list number, thus performing the query process (S122). For instance, in a case where the number of relay devices registered in the query destination list 22 is n and the number of determined list numbers is q, the query unit 15 queries the relay devices corresponding to the list numbers in a sequence of the list numbers (ascending order), for instance, q, q+1, q+2, ..., n, 1, 2, ..., q−1. The queries may be issued to the relay devices corresponding to the respective list numbers, starting from the list number q according to a sequence of the list number (descending order). A process in S122 is identical to that in S48 in FIG. 10. Processes thereafter are identical to those in FIG. 10. Accordingly, the description thereof is omitted.

The process of relaying a response message is identical to that of FIG. 36.

Example 7

Example 7 describes a method of utilizing the hash function in Example 4 and a preset definition of groups, for selecting the highest priority distribution destination and the query destination relay device. In Example 7, elements having configurations and functions identical to those described above are assigned with the identical symbols, and description thereof is omitted.

Figure 38:
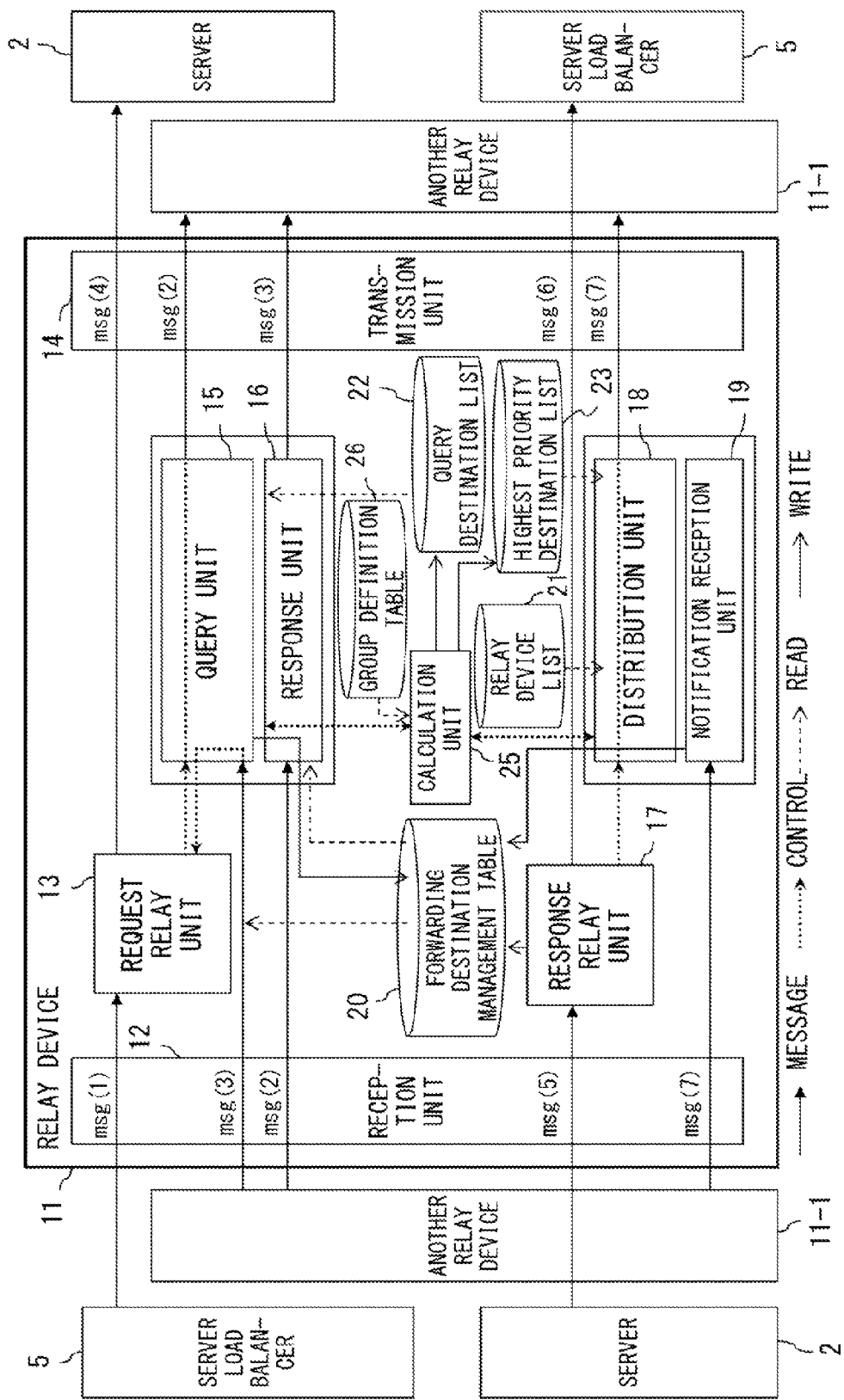
FIG. 38 depicts an example of a relay device in Example 7.

FIG. 38 depicts an example of a relay device in Example 7. The relay device in FIG. 38 is the relay device in FIG. 32 to which a group definition table 26 is added. The group definition table 26 is provided in each relay device. The calculation unit 25 creates the highest priority distribution destination list using the group definition table, in the response message relay process when the session is established.

Figure 39:
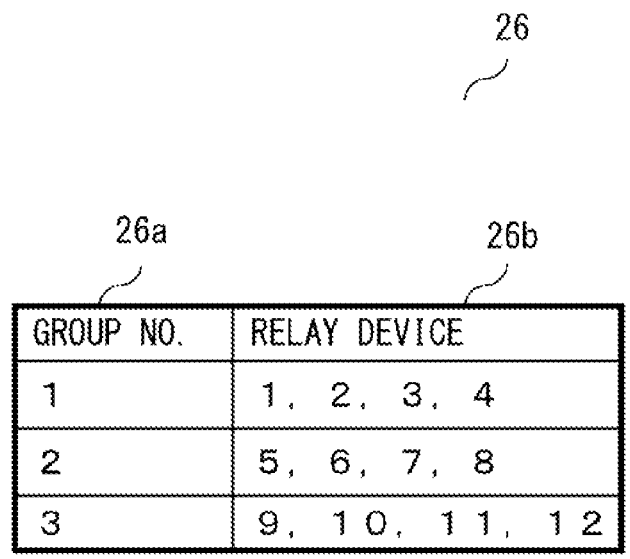
FIG. 39 depicts an example of a group definition table 26 in Example 7.

FIG. 39 depicts an example of the group definition table 26 in Example 7. The group definition table 26 includes data items of "group number" 26*a* and "relay device" 26*b*. Numbers for identifying the groups are stored in "group number" 26*a*. Identification numbers for of the relay devices belonging to the group identified by the group number are stored in "relay device" 26*b*.

Here, it is provided that the number of relay devices is N and these devices are assigned with respective device numbers 0 to N−1. As depicted in FIG. 39, the relay devices are divided into n groups each having N/n members.

The n groups are assigned with respective group numbers 1 to n. In the relay device having processed the initial request and the response message on establishment of the session, the calculation unit 25 performs following processes. When distributing the forwarding destination information, the calculation unit 25 inputs the session ID in the has function, thereby acquiring the hash value H representing the session ID. The calculation unit 25 then performs an operation of H mod n, and registers the relay devices belonging to the group having the group number identical to the numerical value g ($0 \leq g < n$) acquired as the result in the highest priority distribution destination list. The distribution unit 18 distributes the forwarding destination information to the relay devices registered in the highest priority distribution destination list.

When the query is issued for the forwarding destination information, the request message is assigned with the session ID. Accordingly, the calculation unit 25 acquires the hash value H by inputting the session ID in the hash function, as with the case on distribution. The calculation unit 25 then performs the operation of H mod n, and queries the relay devices belonging to the group having the group number identical to the numerical value g ($0 \leq g < N$) acquired as the result.

As long as the session ID is the identical data, the hash value H acquired by inputting the identical data in the hash function is identical, and the numerical value g acquired by performing the operation of H mod n is also identical. Accordingly, the group of relay devices as the highest priority distribution destinations and the group of relay devices as the query destinations that are for the identical session ID match with each other.

Figure 40:
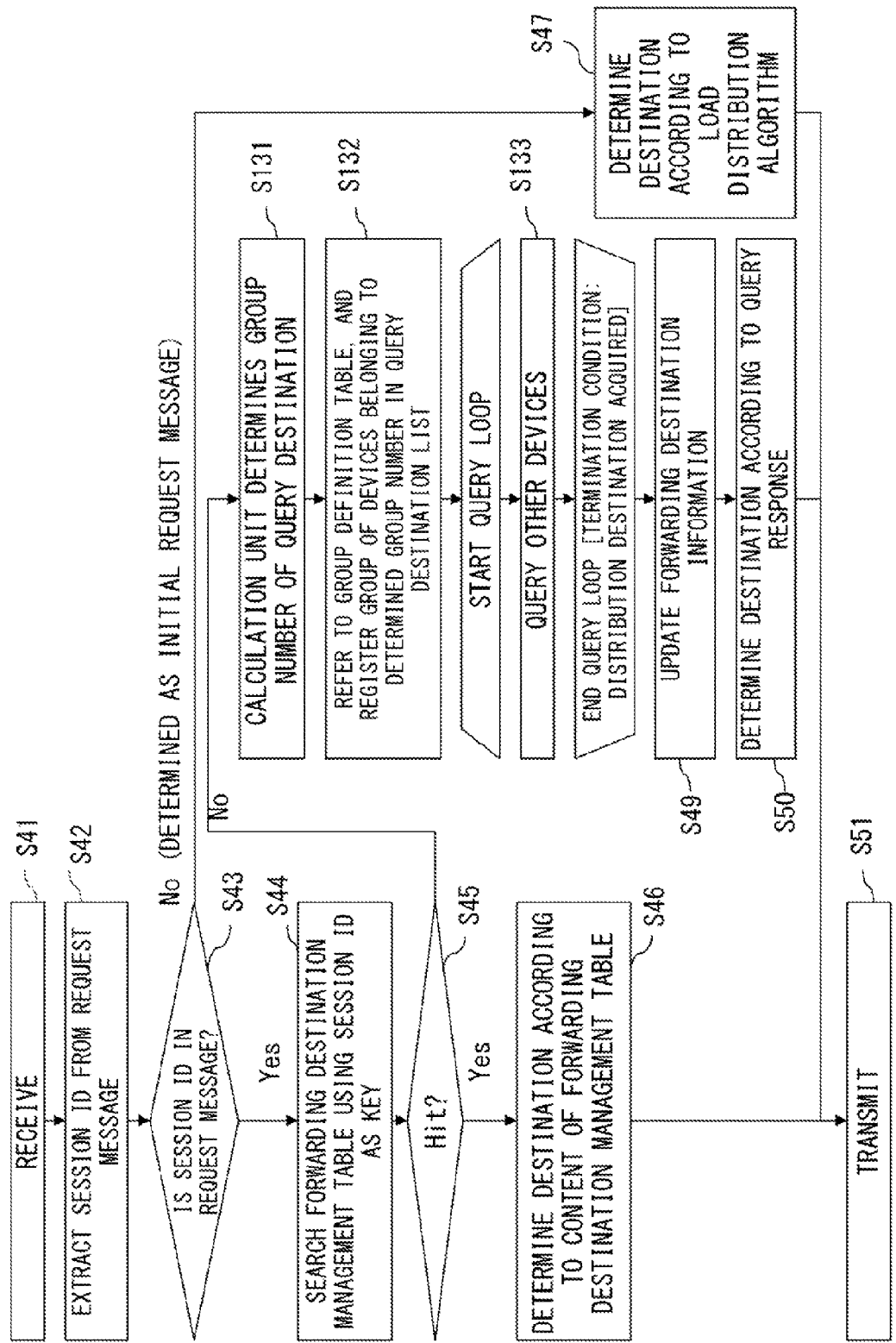
FIG. 40 depicts a flow of a process of relaying a request message in Example 7.

FIG. 40 depicts a flow of a process of relaying a request message in Example 7. The flow of FIG. 40 is the flow of FIG. 10 in which the loop process in S48 is replaced with processes S131 to S133.

If no hit entry has found in the forwarding destination management table 20 as a result of the search in S44 ("No" in S45), the calculation unit 25 determines the group as the query destination using the hash function as described above (S131). More specifically, the calculation unit 25 acquires the hash value H by inputting the session ID extracted in S42 in the hash function. The calculation unit 25 then performs an operation of H mod n, and determines that the numerical value g ($0 \leq g < n$) acquired as the result is the group number as the query destination.

The calculation unit 25 acquires the relay device numbers belonging to the group, from the group definition table 26. The calculation unit 25 registers the addresses of the relay devices identified by the acquired relay device numbers in the query destination list 22 (S132).

The query unit 15 issues the query message (msg (2)) including the session ID extracted in S42 to the relay devices registered in the query destination list 22, thereby performing the query process (S133). Processes thereafter are identical to those in FIG. 10. Accordingly, the description thereof is omitted.

Figure 41:
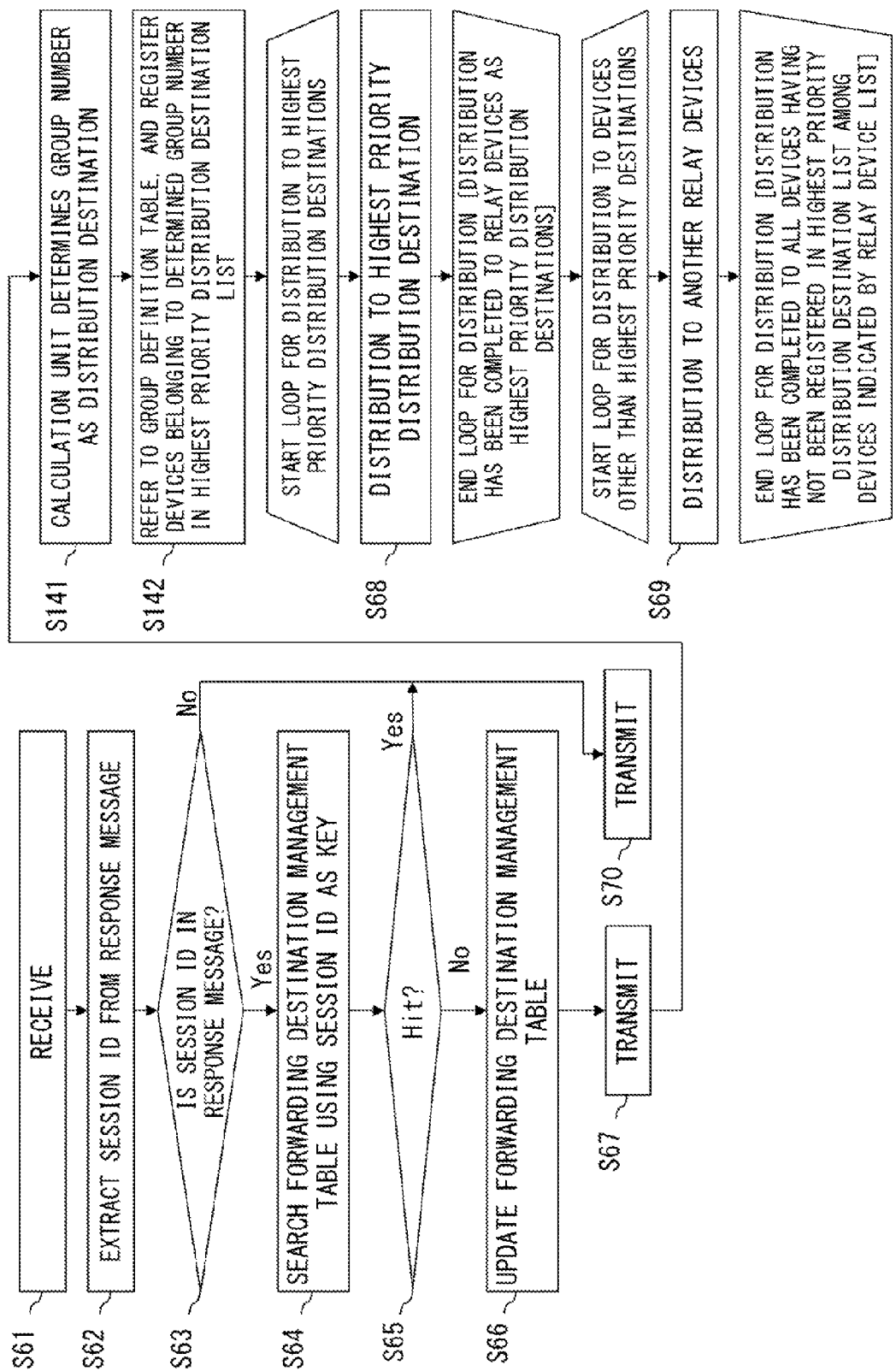
FIG. 41 depicts a flow of a process of relaying a response message in Example 7.

FIG. 41 depicts a flow of a process of relaying a response message in Example 7. The flow of FIG. 41 is the flow of FIG. 18 in which processes in S141 to S142 are added before the loop process in S68.

After the process in S67, the calculation unit 25 determines the group to be the distribution destination using the hash function as described above (S141). That is, the calculation unit 25 acquires the hash value H by inputting the session ID extracted in S62 in the hash function. The calculation unit 25 then performs an operation of H mod n, and determines that the numerical value g ($0 \leq g < n$) acquired as the result is the group number of the distribution destination.

The calculation unit 25 acquires the relay device numbers belonging to the group, from the group definition table 26. The calculation unit 25 registers the addresses of the relay devices identified by the acquired relay device numbers in the highest priority distribution destination list 22 (S142). Processes thereafter are identical to those in FIG. 18. Accordingly, the description thereof is omitted.

Example 8

Example 8 is a combination of Examples 6 and 7. In Example 8, elements having configurations and functions identical to those described above are assigned with the identical symbols, and description thereof is omitted.

Figure 42:
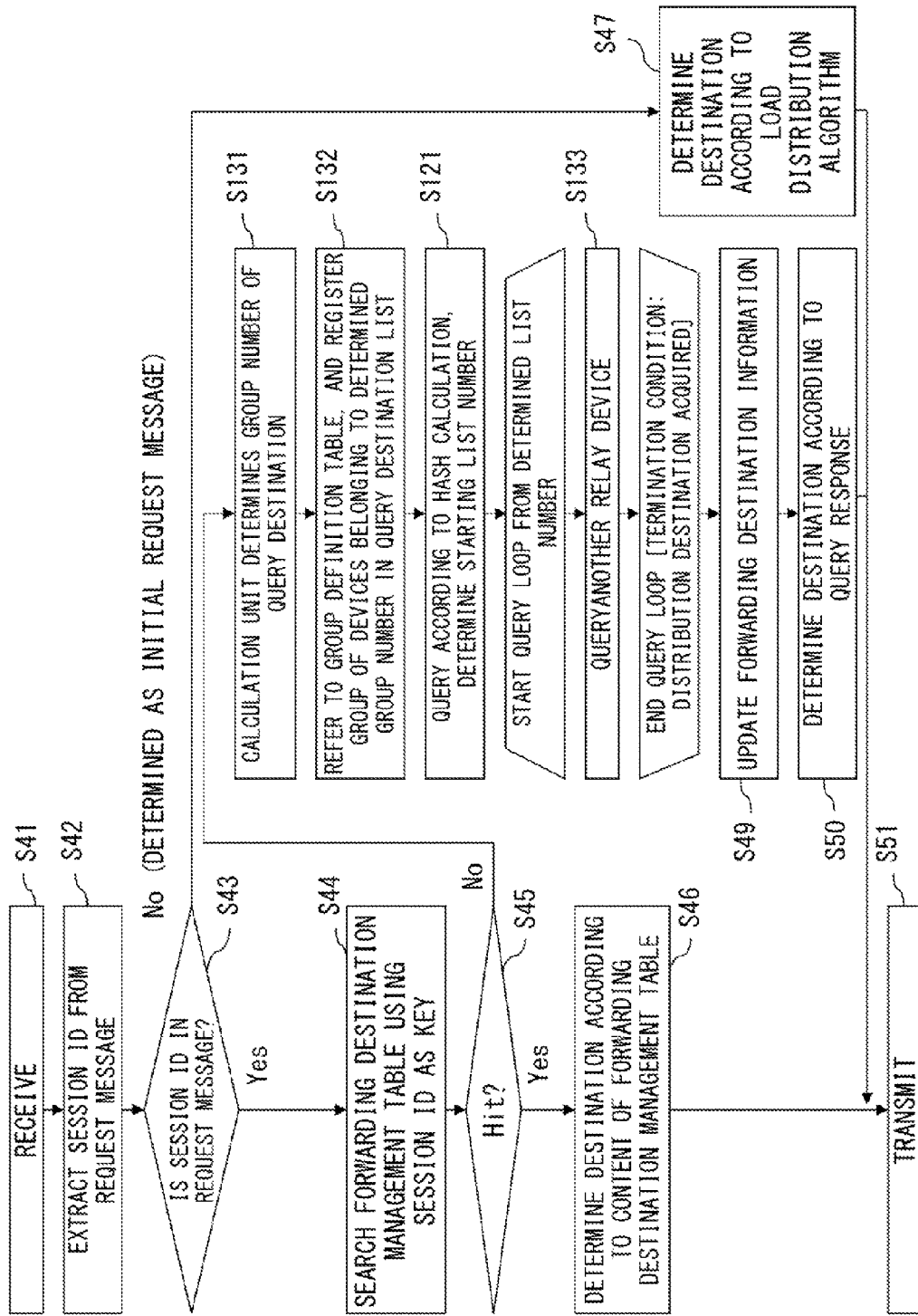
FIG. 42 depicts a flow of a process of relaying a request message in Example 8.

FIG. 42 depicts a flow of a process of relaying a request message in Example 8. The flow of FIG. 42 is the flow of FIG. 40 in which the process in S121 in FIG. 37 is added between the processes in S132 and S133 in FIG. 40.

The calculation unit 25 refers to the group definition table 26, and registers the group of devices belonging to the determined group number in the query destination list 22 (S132). Subsequently, the calculation unit 25 determines the list number from which the query is started in the query destination list 22, using hash calculation (S121). Processes thereafter are identical to those in FIG. 37. Accordingly, the description thereof is omitted.

FIGS. 43 to 45 depict graphs illustrating a response time (expected value) to each request and time taken to completion of one service session (provided that the session includes ten messages). In FIGS. 43 to 45, Example 7 is used as a model. Referring to FIGS. 43 to 45, an advantageous effect of reducing delay time of the response message for a request message will hereinafter be described.

In FIGS. 43 to 45, the abscissa indicates time [msec] elapsed from receiving the response message in response to the initial request message. The ordinate indicates an expected value of time in which the terminal transmits the request message and receives the response message in response thereto (expected value of delay of a response to a request [msec]).

In FIG. 43, measurement is made in following conditions.
delay in relay process: 10 [msec]
delay in setting process: 20 [msec]
delay in query: 20 [msec]
the number of relay devices: 10
the number of devices in a group: 2
request issuance interval (time from receiving the previous message to issuing the next message): 100 [msec],
the number of messages per session: 10

The configuration in FIG. 2 is used as a comparative example.

The expected value of time within which the response message for each request message arrives is approximately 30 [msec] in the comparative example, while the value is approximately 11 [msec] in Example 7. The delay time is shorter in Example 7.

In the comparative example, the expected value of time within which the response message for the first request message arrives is approximately 210 [msec]. In contrast, in Example 7, the expected value of time within which the response message for the first request message arrives is approximately 10 [msec]; the variation of time until response is small. In Example 7, the request issuance interval is constant. However, in the comparative example, time from receiving the first message to issuing the next message is at least 250 [msec]. This time is shorter in Example 7. Time to reception of the last message of one session is 1009 [msec] in Example 7, and approximately 1200 [msec] in the comparative example. The time per session is shorter in Example 7.

In FIG. 44, measurement is made in following conditions.
delay in relay process: 10 [msec]
delay in setting process: 20 [msec]
delay in query: 20 [msec]
the number of relay devices: 100
the number of devices in a group: 10
request issuance interval (time from receiving the previous message to issuing the next message): 100 [msec],
the number of messages per session: 10

The configuration in FIG. 2 is used as a comparative example.

The expected value of time within which the response message for each request message arrives is approximately 210 [msec] in the comparative example, while the value is approximately 23 [msec] in Example 7. The delay time is shorter in Example 7.

In comparison with the comparative example, the expected value of time within which the response message for the first request message arrives, the request issuance interval, and the time per session are shorter in Example 7.

In FIG. 45, measurement is made in following conditions.
delay in relay process: 10 [msec]
delay in setting process: 20 [msec]
delay in query: 20 [msec]
the number of relay devices: 10
the number of devices in a group: 2
request issuance interval (time from receiving the previous message to issuing the next message): 100 [msec],
the number of messages per session: 5

The configuration in FIG. 2 is used as a comparative example.

The expected value of time within which the response message for each request message arrives is approximately 30 [msec] in the comparative example, while the value is approximately 17 [msec] in Example 7. The delay time is shorter in Example 7.

In comparison with the comparative example, the expected value of time within which the response message for the first request message arrives, the request issuance interval, and the time per session are shorter in Example 7.

In every case using the conditions, reduction in delay time accompanying the distribution and query of the forwarding destination information in turn reduces the average response time to the terminal to a fraction to one tenth.

Further, analogous effects can also be acquired in Examples 1 to 6 and 8. That is, in comparison with the comparative example, it can be expected that the expected value of time within which the response message for the first request message arrives, the request issuance interval, and the time per session are shorter in Examples 1 to 6 and 8.

Figure 46:
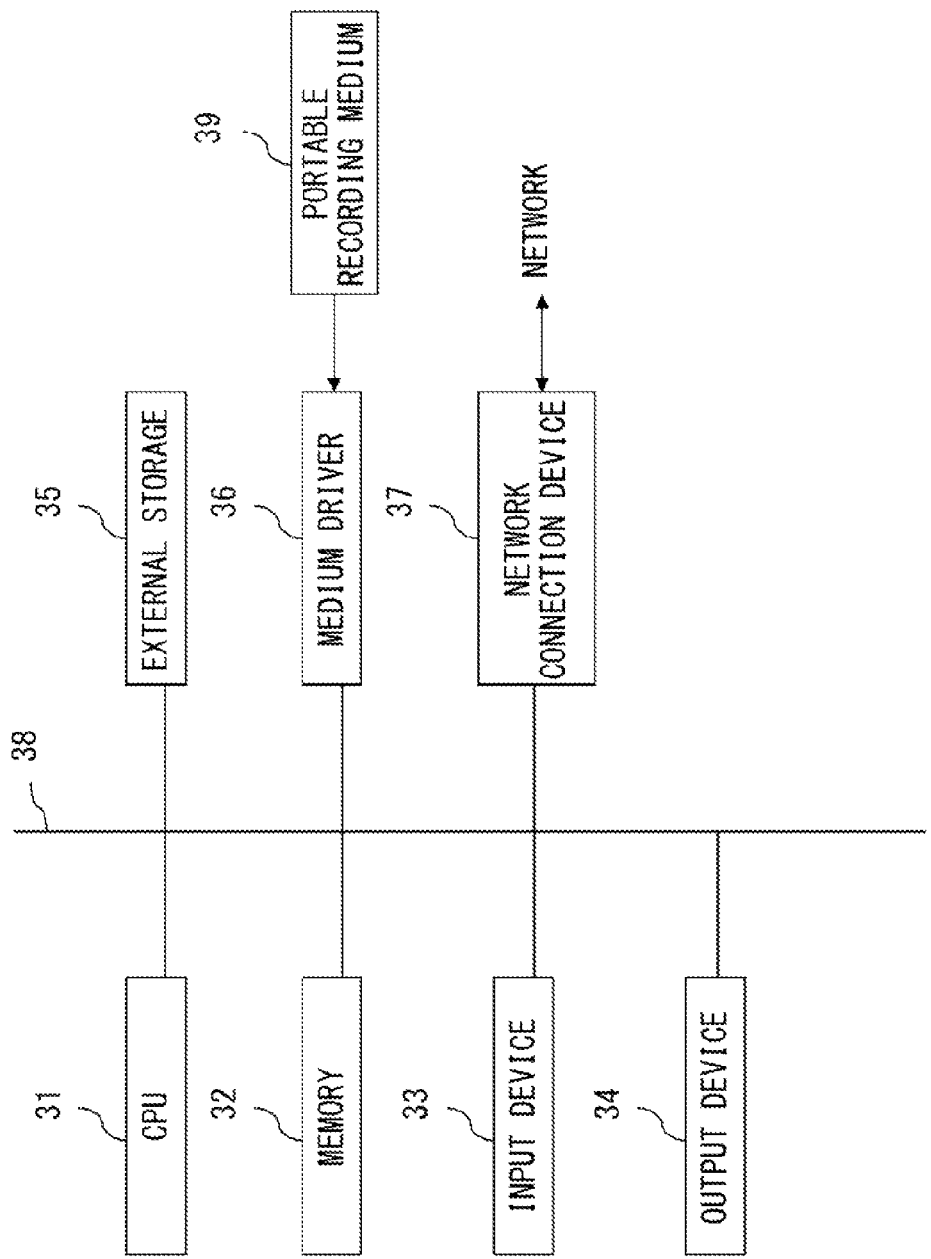
FIG. 46 is a diagram depicting an example of a hardware configuration of a computer to which this embodiment is applicable.

FIG. 46 is a diagram depicting an example of a hardware configuration of a computer to which this embodiment is applicable. Each of the terminal device 1, the server 2, the relay device 11, and the server load balancer 5 can be operated by causing a computer to execute a dedicated program. The terminal device 1 is realized by causing a computer to execute a client application 12. The server 3 is realized by causing a computer to execute a server application 31. The relay device 2 is realized by causing a computer to execute a program allowing messages to be relayed. The server load balancer 5 is realized by causing a computer to execute a program of distributing the load. Here, referring to FIG. 46, a computer capable of being used as the terminal device 1, the server 2, the relay device 11 or the server load balancer 5 is specifically described.

The computer depicted in FIG. 46 includes a CPU 31, a memory 32, an input device 33, an output device 34, an external storage 35, a medium driver 36, and a network connection device 37. These elements are connected to each other via a bus 38. The configuration depicted in FIG. 18 is an example. The configuration is not limited thereto.

The CPU (Central Processing Unit) 31 performs overall control of the computer. The memory 32 is a semiconductor memory such as RAM that temporarily stores a program or data, having been stored in the external storage 35 (or a portable recording medium 39), when executing the program and updating the data. The CPU 31 reads the program on the memory 32 and executes the program, thereby performing the overall control. In this embodiment, the CPU 31 of the relay device 11 reads the program for performing the processing described in this embodiment, and functions as the request relay unit 13, the query unit 15, the response unit 16, the response relay unit 17, the distribution unit 18, the notification reception unit 19, and the calculation unit 25.

The input device 33 allows data to be input and output via operation devices, such as for instance a keyboard and a mouse. The input device 33 is an interface connectable to the operation device, or includes the operation device and the interface. The input device 33 detects an operation by a user to the operation device, and notifies the CPU 31 of the detection result. The operation device may be a console or the like.

The output device 34 is, for instance, a display device, or a display control device connected to a display device. The external storage 35 is, for instance, a hard disk device, a flash memory device or the like, and used mainly for storing various pieces of data and programs. The external storage 35 stores, for instance, the forwarding destination management table 20, the relay device list 21, the query destination list 22, the highest priority distribution destination list 23, the group-device list 24, and the group definition table 26.

The medium driver 36 accesses the portable recording medium 39, such as an optical disk, a magneto-optical disk, a USB (Universal Serial Bus) memory device, a memory card or the like. The network connection device 37 is for communicating with an external device via a communication network. The network connection device 37 of the relay device 11 functions as the reception unit 12 and the transmission unit 14, which are described in this embodiment.

The program for performing the processing described in this embodiment is stored in the external storage 35 or the recording medium 39, or acquired from the network connection device 37 via the communication network. In a case of assuming that the program is stored in the external storage 35, configurational components, which are the terminal device 1, the relay device 11, the server 2 and the server load balancer are realized by means of combination of following configurational components of the computer. The combination is in a case of further assuming that all the terminal device 1, the relay device 11, the server 2 and the server load balancer 5 are connected to the identical communication network (e.g., LAN (Local Area Network), the Internet etc.).

According to the above embodiment, a relay device relaying communication between an information processing terminal and an information processing device includes the first extraction unit, a transmission unit, the second extraction unit, and a query unit. An example of the information processing terminal is the terminal 1. An example of the information processing device is the server 2, which, in response to request information transmitted from the information processing terminal, returns the response information to the information processing terminal. An example of the relay device is the relay device 11.

When the response information to the initial request information from the information processing terminal is received from the information processing device, the first extraction unit performs following processes. The first extraction unit extracts the first session identification information for identifying a session established between the information processing terminal and the information processing device, and the address of the information processing device, from the received response information, and stores the extracted information and address in the first storage unit. Here, the session identification information is information for identifying the session established between the information processing terminal having transmitted the request information and the information processing device having received the request information. An example of the session identification information includes the session ID. An example of the first extraction unit includes the response relay unit 17. An example of the first storage unit includes the forwarding destination management table 20.

The transmission unit transmits the response information to the information processing terminal. The transmission unit transmits session supporting address information, which includes the extracted first session identification information and the address of the information processing device, to at least one relay device other than the relay device. Examples of the transmission unit include the response relay unit 17 and the distribution unit 18. An example of the session supporting address information includes the forwarding destination information (the session ID, the forwarding destination server address) included in the notification message (msg (7)) in FIG. 22.

The second extraction unit extracts second session identification information, from the request information for the second time or later received from the information processing terminal. An example of the second extraction unit includes the request relay unit 13.

If the session supporting address information corresponding to the extracted second session identification information is not stored in the first storage unit, the query unit queries at least one relay device for the session supporting address information corresponding to the second session identification information. An example of the query unit includes the query unit 15.

This configuration can reduce the delay time from the time when the request information is transmitted from the information processing terminal to the time when the response information from the information processing device for the request information is received. Further, this configuration can reduce the expected value of time within which the response message for the first request message arrives, the request issuance interval, the time per session, while maintaining the session (uniqueness assurance). A variation of such a configuration includes, for instance, a following configuration.

The relay devices are classified into groups. The transmission unit transmits the session supporting address information to any of the relay devices in each group. When the query unit issues a query for the session supporting address information corresponding to the extracted second session identification information, the query unit queries another relay device to which the session supporting address information has been transmitted and which belongs to the group to which the own device belongs.

The relay devices are sequentially assigned with respective sequential numbers. The transmission unit calculates the hash value of the first session identification information using the hash function. Further, the transmission unit transmits the session supporting address information to the relay device assigned with the number identical to a value k (k: arbitrary integer) of a remainder acquired by dividing the hash value by the number of relay devices. In this case, examples of the transmission unit include not only the transmission unit 18 but also the calculation unit 25.

When the query unit issues a query for the session supporting address information corresponding to the extracted second session identification information, the query unit calculates a hash value of the second session identification information using a hash function. Further, the query unit queries the relay device assigned with the number identical to a value of a remainder acquired by dividing the hash value by the number of relay devices. In this case, examples of the query unit include not only the query unit 15 but also the calculation unit 25.

The transmission unit transmits the session supporting address information to the relay devices assigned with the numbers identical to respective values from k to k+n (n: arbitrary integer). In this case, examples of the transmission unit include not only the transmission unit 18 but also the calculation unit 25.

When the query unit issues the session supporting address information corresponding to the extracted second session identification information, the query unit queries the relay devices assigned with the numbers identical to the respective values from k to k+n (n: arbitrary integer). In this case, examples of the query unit include not only the query unit 15 but also the calculation unit 25.

The relay device further includes a second storage unit. The second storage unit stores address information of the relay device as a transmission destination of the session supporting address information. An example of the second storage unit includes the highest priority distribution destination list 23.

When the query unit issues a query for session supporting address information corresponding to the extracted second session identification information, the query unit calculates a hash value of the second session identification information using a hash function. The query unit then calculates a value k (k: arbitrary integer) of a remainder by dividing the hash value by the number of addresses registered in the second storage unit. Further, the query unit queries the relay devices corresponding to the address information registered in the second storage unit, according to an ascending order or a descending order starting from the relay device corresponding to the address registered as a k-th entry in the second storage unit. In this case, examples of the query unit include not only the query unit 15 but also the calculation unit 25.

The relay devices are classified into groups. The groups are sequentially assigned with respective sequential numbers. The relay device further includes a third storage unit.

The third storage unit stores the numbers assigned to the groups, and the numbers assigned to the relay devices belonging to each group corresponding to the number assigned to the group. An example of the third storage unit includes the group definition table 26.

The transmission unit calculates a hash value of the first session identification information using a hash function. The transmission unit then retrieves, from the third storage unit, the relay devices belonging to the group assigned with the number identical to a value g (g: arbitrary integer) of a remainder acquired by dividing the hash value by the number of groups. The transmission unit transmits the session supporting address information to the retrieved relay devices. In this case, examples of the transmission unit include not only the transmission unit 18 but also the calculation unit 25.

When the query unit issues queries for the session supporting address information corresponding to the extracted second session identification information, the query unit calculates a hash value of the second session identification information using a hash function. The query unit then searches the third storage unit to retrieve the relay devices belonging to the group assigned with the number identical to the value g (g: arbitrary integer) of a remainder acquired by dividing the hash value by the number of groups. The query unit further queries the retrieved relay devices. In this case, examples of the query unit include not only the query unit 15 but also the calculation unit 25.

The query unit calculates a value h (h: arbitrary integer) of a remainder of further division by the number of relay devices belonging to the group assigned with the number identical to the calculated hash value g. The query unit queries the relay devices belonging to the group according to an ascending or a descending order starting from the relay device registered as an h-th entry in the third storage unit.

The transmission unit, after transmitting the session supporting address information to the relay device as a transmission destination of the session supporting address information, transmits the session supporting address information to the relay devices other than the relay device to which the information has already been transmitted.

The transmission unit of the relay device to which the session supporting address information has been transmitted in each group transmits the session supporting address information to the remaining relay device belonging to the group to which the own device belongs.

The technique described in this specification can reduce delay time from the time when the request information is transmitted from the information processing terminal to the time when the response information from the information processing device for the request information.

This embodiment is not limited to the aforementioned exemplary embodiments. Various configuration and embodiments can be adopted within a scope without departing the gist of this embodiment. Two or more of Examples 1 to 8 may be combined within a scope in which those skilled in the art can implement the technique.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a depicting of the superiority and inferiority of the invention. Although the embodiments of the present invention have been described in detail, it should be understood that the various changes, substitutions, and alterations could be made hereto without departing from the spirit and scope of the invention.

What is claimed is:

1. A relay device that relays communication between an information processing terminal and an information processing device, the relay device comprising:
    a first extraction unit that, when receiving from the information processing device response information for initial request information issued by the information processing terminal, extracts first session identification information for identifying a session established between the information processing terminal and the information processing device, and an address of the information processing device, from the received response information, and stores the extracted information and address in a first storage unit;
    a transmission unit that transmits the response information to the information processing terminal, and transmits session supporting address information including the extracted first session identification information and address of the information processing device to at least one of other relay devices;
    a second extraction unit that extracts second session identification information, from request information for a second time or later received from the information processing terminal; and
    a query unit that, when the session supporting address information corresponding to the extracted second session identification information is not stored in the first storage unit, queries the at least one of the other relay devices for the session supporting address information corresponding to the second session identification information.

2. The relay device according to claim 1,
wherein the relay devices are classified into groups,
the transmission unit transmits the session supporting address information to any of the relay devices in each group, and
when the query unit issues a query for the session supporting address information corresponding to the extracted second session identification information, the query unit queries the relay device to which the session supporting address information has been transmitted in the group to which the own device belongs.

3. The relay device according to claim 1,
wherein the relay devices are sequentially assigned with respective sequential numbers,
the transmission unit calculates a hash value of the first session identification information using a hash function, and transmits the session supporting address information to the relay device assigned with the number identical to a value k (k: arbitrary integer) of a remainder acquired by dividing the hash value by the number of relay devices, and
when the query unit issues a query for the session supporting address information corresponding to the extracted second session identification information, the query unit calculates a hash value of the second session identification information using a hash function, and queries the relay device assigned with the number identical to a value of a remainder acquired by dividing the hash value by the number of relay devices.

4. The relay device according to claim 1,
wherein the transmission unit transmits the session supporting address information to the relay devices assigned with the numbers identical to respective values from k to k+n (n: arbitrary integer), and
when the query unit issues the session supporting address information corresponding to the extracted second session identification information, the query unit queries the relay devices assigned with the numbers identical to the respective values from k to k+n (n: arbitrary integer).

5. The relay device according to claim 1, further comprising
    a second storage unit that stores address information of the relay device as a transmission destination of the session supporting address information,
    wherein, when the query unit issues a query for session supporting address information corresponding to the extracted second session identification information, the query unit calculates a hash value of the second session identification information using a hash function, calculates a value k (k: arbitrary integer) of a remainder by dividing the hash value by the number of addresses registered in the second storage unit, and queries the relay devices corresponding to the address information registered in the second storage unit, according to an ascending order or a descending order starting from the relay device corresponding to the address registered as a k-th entry in the second storage unit.

6. The relay device according to claim 1,
wherein the relay devices are classified into groups, and the groups are sequentially assigned with respective sequential numbers, and
the relay device further comprises
a third storage unit that stores the numbers assigned to the groups, and the numbers assigned to the relay devices belonging to each group corresponding to the number assigned to the group,
the transmission unit calculates a hash value of the first session identification information using a hash function, searches the third storage unit to retrieve the relay devices belonging to the group assigned with the number identical to a value g (g: arbitrary integer) of a remainder acquired by dividing the hash value by the number of groups, and transmits the session supporting address information to the retrieved relay devices, and
when the query unit issues queries for the session supporting address information corresponding to the extracted second session identification information, the query unit calculates a hash value of the second session identification information using a hash function, searches the third storage unit to retrieve the relay devices belonging to the group assigned with the number identical to the value g (g: arbitrary integer) of a remainder acquired by dividing the hash value by the number of groups, and queries the retrieved relay devices.

7. The relay device according to claim 6,
wherein the query unit calculates a value h (h: arbitrary integer) of a remainder of further division by the number of relay devices belonging to the group assigned with the number identical to the calculated hash value g, and queries the relay devices belonging to the group according to an ascending or a descending order starting from the relay device registered as an h-th entry in the third storage unit.

8. The relay device according to claim 1,
wherein the transmission unit, after transmitting the session supporting address information to the relay device as a transmission destination of the session supporting address information, transmits the session supporting address information to the relay devices other than the relay device to which the information has already been transmitted.

9. The relay device according to claim 2,
wherein the transmission unit of the relay device to which the session supporting address information has been transmitted in each group transmits the session supporting address information to the remaining relay device belonging to the group to which the own device belongs.

10. A non-transitory computer-readable medium storing a relay program for causing a relay device relaying communication between an information processing terminal and an information processing device to perform procedure, the procedure comprising:
when receiving from the information processing device response information for initial request information issued by the information processing terminal, extracting first session identification information for identifying a session established between the information processing terminal and the information processing device, and an address of the information processing device, from the received response information, and storing the extracted information and address in a first storage unit;
transmitting the response information to the information processing terminal, and transmitting session supporting address information including the extracted first session identification information and address of the information processing device to at least one of other relay devices;
extracting second session identification information, from request information for a second time or later received from the information processing terminal; and
when the session supporting address information corresponding to the extracted second session identification information is not stored in the first storage unit, querying the at least one of the other relay devices for the session supporting address information corresponding to the second session identification information.

11. The non-transitory storing medium according to claim 10,
wherein the relay devices are classified into groups,
in the process of transmitting the session supporting address information, transmitting the session supporting address information to any of the relay devices in each group, and
in the process of querying, when issuing a query for the session supporting address information corresponding to the extracted second session identification information, querying the relay device to which the session supporting address information has been transmitted in the group to which the own device belongs.

12. The non-transitory storing medium according to claim 10,
wherein the relay devices are sequentially assigned with respective sequential numbers,
in the process of transmitting the session supporting address information, calculating a hash value of the first session identification information using a hash function, and transmitting the session supporting address information to the relay device assigned with the number identical to a value k (k: arbitrary integer) of a remainder acquired by dividing the hash value by the number of relay devices, and
in the process of querying, when issuing a query for the session supporting address information corresponding to the extracted second session identification information, calculating a hash value of the second session identification information using a hash function, and querying the relay device assigned with the number identical to a value of a remainder acquired by dividing the hash value by the number of relay devices.

13. The non-transitory storing medium according to claim 10,
wherein in the process of transmitting the session supporting address information, transmitting the session supporting address information to the relay devices assigned with the numbers identical to respective values from k to k+n (n: arbitrary integer), and
in the process of querying, when issuing the session supporting address information corresponding to the extracted second session identification information, querying the relay devices assigned with the numbers identical to the respective values from k to k+n (n: arbitrary integer).

14. The non-transitory storing medium according to claim 10,
wherein, in the process of querying, when issuing session supporting address information corresponding to the extracted second session identification information, calculating a hash value of the second session identification information using a hash function, acquiring from a second storage unit the number of addresses of the relay devices as transmission destinations of the session supporting address information, calculating a value k (k: arbitrary integer) of a remainder by dividing the hash value by the acquired number of addresses of the relay devices as the transmission destinations, and querying the relay devices corresponding to the address information registered in the second storage unit, according to an ascending order or a descending order starting from the relay device corresponding to the address registered as a k-th entry in the second storage unit.

15. The non-transitory storing medium according to claim 10,
wherein the relay devices are classified into groups, and the groups are sequentially assigned with respective sequential numbers,
in the process of transmitting the session supporting address information, calculating a hash value of the first session identification information using a hash function, retrieving, from a third storage unit storing the numbers assigned to the groups and the numbers assigned to the relay devices belonging to each group corresponding to the number assigned to the group, the relay devices belonging to the group assigned with the number identical to a value g (g: arbitrary integer) of a remainder acquired by dividing the hash value by the number of groups, and transmitting the session supporting address information to the retrieved relay devices, and
in the process of querying, when issuing queries for the session supporting address information corresponding to the extracted second session identification information, calculating a hash value of the second session identification information using a hash function, searching the third storage unit to retrieve the relay devices belonging to the group assigned with the number identical to the value g (g: arbitrary integer) of a remainder acquired by dividing the hash value by the number of groups, and querying the retrieved relay devices.

16. A relay method executed by a relay device that relays communication between an information processing terminal and an information processing device, the relay method comprising:
when receiving from the information processing device response information for initial request information issued by the information processing terminal, extracting first session identification information for identifying a session established between the information processing terminal and the information processing device, and an address of the information processing device, from the received response information, and storing the extracted information and address in a first storage unit,
transmitting the response information to the information processing terminal, and transmitting session supporting address information including the extracted first session identification information and address of the information processing device to at least one of other relay devices;
extracting second session identification information, from request information for a second time or later received from the information processing terminal and
when the session supporting address information corresponding to the extracted second session identification information is not stored in the first storage unit, querying the at least one of the other relay devices for the session supporting address information corresponding to the second session identification information.

17. The relay method according to claim 16,
wherein the relay devices are classified into groups,
the relay device performs processes of:
in the process of transmitting the session supporting address information, transmitting the session supporting address information to any of the relay devices in each group, and
in the process of querying, when issuing a query for the session supporting address information corresponding to the extracted second session identification information, querying the relay device to which the session supporting address information has been transmitted in the group to which the own device belongs.

18. The relay method according to claim 16,
wherein the relay devices are sequentially assigned with respective sequential numbers,
the relay device performs processes of:
in the process of transmitting the session supporting address information, calculating a hash value of the first session identification information using a hash function, and transmitting the session supporting address information to the relay device assigned with the number identical to a value k (k: arbitrary integer) of a remainder acquired by dividing the hash value by the number of relay devices, and
in the process of querying, when issuing a query for the session supporting address information corresponding to the extracted second session identification information, calculating a hash value of the second session identification information using a hash function, and querying the relay device assigned with the number identical to a value of a remainder acquired by dividing the hash value by the number of relay devices.

19. The relay method according to claim 16,
wherein the relay device performs process of:
in the process of transmitting the session supporting address information, transmitting the session supporting address information to the relay devices assigned with the numbers identical to respective values from k to k+n (n: arbitrary integer), and
in the process of querying, when issuing the session supporting address information corresponding to the extracted second session identification information, querying the relay devices assigned with the numbers identical to the respective values from k to k+n (n: arbitrary integer).

20. The relay method according to claim 16,
wherein the relay device performs processes of:
in the process of querying, when issuing session supporting address information corresponding to the extracted second session identification information, calculating a hash value of the second session identification information using a hash function, acquiring from a second storage unit the number of addresses of the relay devices as transmission destinations of the session supporting address information, calculating a value k (k: arbitrary integer) of a remainder by dividing the hash value by the acquired number of addresses of the relay devices as the transmission destinations, and querying the relay devices corresponding to the address information registered in the second storage unit, according to an ascending order or a descending order starting from the relay device corresponding to the address registered as a k-th entry in the second storage unit.

* * * * *